United States Patent
Foley et al.

(10) Patent No.: US 12,528,991 B2
(45) Date of Patent: *Jan. 20, 2026

(54) CITRONELLOL ALKOXYLATE SURFACTANTS

(71) Applicant: P2 SCIENCE, INC., Woodbridge, CT (US)

(72) Inventors: Patrick Foley, New Haven, CT (US); Ted Anastasiou, New Haven, CT (US)

(73) Assignee: P2 SCIENCE, INC., Woodbridge, CT (US)

( * ) Notice: Subject to any disclaimer, the term of this patent is extended or adjusted under 35 U.S.C. 154(b) by 532 days.

This patent is subject to a terminal disclaimer.

(21) Appl. No.: 17/812,956

(22) Filed: Jul. 15, 2022

(65) Prior Publication Data

US 2023/0058226 A1    Feb. 23, 2023

Related U.S. Application Data

(60) Provisional application No. 63/222,170, filed on Jul. 15, 2021.

(51) Int. Cl.
C09K 23/44    (2022.01)
C07C 235/08    (2006.01)

(52) U.S. Cl.
CPC ............ C09K 23/44 (2022.01); C07C 235/08 (2013.01)

(58) Field of Classification Search
CPC .............................. C09K 23/44; C07C 235/08
See application file for complete search history.

(56) References Cited

U.S. PATENT DOCUMENTS

| | | |
|---|---|---|
| 3,829,505 A | 8/1974 | Johnston |
| 5,030,768 A | 7/1991 | Chen et al. |
| 5,264,547 A | 11/1993 | Yamaguchi et al. |
| 5,616,679 A | 4/1997 | Fies et al. |
| 6,355,845 B1 | 3/2002 | Clement et al. |
| 6,359,101 B1 | 3/2002 | O'Connor et al. |
| 9,200,298 B2 | 12/2015 | Lee et al. |
| 9,982,073 B2 | 5/2018 | Ghandi et al. |
| 10,059,801 B2 | 8/2018 | Foley et al. |
| 10,844,169 B2 | 11/2020 | Foley et al. |
| 11,008,271 B2 | 5/2021 | Foley et al. |
| 11,518,850 B2 | 12/2022 | Foley et al. |
| 11,827,746 B2 | 11/2023 | Foley et al. |
| 11,872,300 B2 | 1/2024 | Foley |
| 12,084,543 B2 | 9/2024 | Foley et al. |
| 2002/0076426 A1* | 6/2002 | Zirnstein et al. ...... A61K 47/30 424/401 |
| 2005/0256347 A1 | 11/2005 | Goebbel |
| 2006/0018977 A1 | 1/2006 | Bruza et al. |
| 2009/0169652 A1 | 7/2009 | Osborne |
| 2017/0283553 A1 | 10/2017 | Foley et al. |
| 2020/0165383 A1 | 5/2020 | Foley et al. |
| 2020/0179247 A1 | 6/2020 | Verdier et al. |
| 2020/0392287 A1 | 12/2020 | Foley et al. |
| 2021/0230364 A1 | 7/2021 | Bhattacharjee et al. |
| 2021/0275430 A1 | 9/2021 | Foley et al. |
| 2022/0259524 A1 | 8/2022 | Struillou |
| 2022/0380290 A1 | 12/2022 | Foley |
| 2022/0380291 A1 | 12/2022 | Foley |
| 2022/0380678 A1 | 12/2022 | Foley |
| 2023/0057412 A1 | 2/2023 | Foley et al. |
| 2023/0063141 A1 | 3/2023 | Foley et al. |

FOREIGN PATENT DOCUMENTS

| | | | |
|---|---|---|---|
| DE | 102005025739 A1 * | 12/2006 | ................ C08F 2/24 |
| EP | 191828854 | 6/2019 | |
| GB | 1266091 | 3/1972 | |
| JP | 2006/273796 A | 10/2006 | |
| JP | 2008050415 A | 3/2008 | |
| WO | 2006/057086 | 3/2016 | |
| WO | 2019/029808 | 2/2019 | |
| WO | 2019/059375 | 3/2019 | |
| WO | WO 2021/146461 | 7/2021 | |

OTHER PUBLICATIONS

Translated copy of Glos (DE102005025739A1) (Year: 2006).*
English language machine translation of Glos (DE 102005025739 A1) (Year: 2006).*
Abstract of Japanese Patent Application No. 2006-273796, published Oct. 12, 2006 (1 page).
Abstract of Japanese Patent Application No. 2008-050415, published Mar. 6, 2008 (1 page).
Nagai (Bulletin of the Chemical Society of Japan (1976), 49(1), 265-9) (Year: 1976).
Nagai, "The Formation of Ethers from dl-Citronellol in the Presence of Boron Trifluoride Etherate," Bulletin of the Chemical Society of Japan, vol. 49, No. 1, pp. 265-269, (1976).
Nagai, et al., "The Formation of Ethers from Unsaturated Aliphatic Alcohols in the Presence of Boron Trifluoride Etherate," Bulletin of the Chemical Society of Japan, vol. 51, No. 11, pp. 3273-3276, (1978).
Paroul et al., "Solvent-Free Production of Bioflavors by Enzymatic Esterification of Citronella (*Cymbopogon winterianus*) Essential Oil," Applied Biochemistry and Biotechnology, vol. 166, p. 13-21, (2012); Abstract only.
PubChem, OPEN Chemistry Database, PubChem CID 11172890, (2006), 10 pages.
PubChem, OPEN Chemistry Database, PubChem CID 23297377, (2007), 9 pages.
PubChem, OPEN Chemistry Database, PubChem CID 8892, pp. 4, (2004), 60 pages.
PubChem, OPEN Chemistry Database, PubChem SID 105168722, PubChem CID 112049, (2011), 7 pages.
PubChem, OPEN Chemistry Database, PubChem SID 355155508, PubChem CID 114416, (2018), 6 pages.
Pubchem. CID 13469549, Feb. 8, 2007, 11 pages; retrieved on Sep. 10, 2018 from http://pubchem.ncbi.nlm.nih.gov/compound/013469549#section=Top>.

* cited by examiner

*Primary Examiner* — Amy C Bonaparte
*Assistant Examiner* — Derek Rhoades
(74) *Attorney, Agent, or Firm* — Hoxie & Associates LLC

(57) ABSTRACT

The present disclosure is directed to novel derivatives of citronellol and polycitronellol, particularly alkoxylated derivatives of citronellol and polycitronellol, and methods of making them, compositions comprising them, and methods for using them, particularly as surfactants.

24 Claims, No Drawings

CITRONELLOL ALKOXYLATE SURFACTANTS

CROSS-REFERENCE TO RELATED APPLICATIONS

This application is U.S. nonprovisional application claiming priority to and the benefit of U.S. Provisional Application No. 63/222,170, filed on Jul. 15, 2021, the contents of which are hereby incorporated by reference in its entirety.

FIELD OF INVENTION

The present disclosure is directed to novel derivatives of citronellol and polycitronellol, particularly ethoxylated and propoxylated derivatives of citronellol and polycitronellol, and methods of making them, compositions comprising them, and methods for using them, particularly as surfactants.

BACKGROUND

Surfactants are a multimillion-dollar annual industry. Surfactants are generally molecules which have at least one strongly polar or ionic functional group and at least one strongly nonpolar or hydrophobic functional group, generally positioned at opposite ends of a largely linear molecule. Thus, one end of a surfactant molecule is usually hydrophilic, while the other end is hydrophobic. The unique chemical property of surfactants is their ability to dissolve in both aqueous media and nonpolar (hydrophobic) media by virtue of this amphiphilic divided structure. They find use in a variety of products, often at the junction between aqueous and hydrophobic environments, especially when they are used in soaps and detergents. Functionally, surfactants are often used as wetting agents, detergents, soaps, emulsifiers, foaming agents, and dispersants. They are also commonly used in a variety of multicomponent compositions in order to stabilize the interactions between hydrophobic and hydrophilic ingredients.

There are a variety of different classes of commercially available surfactants, most of which are derived from petrochemical feedstocks. These include anionic surfactants such as sulfates, sulfonates, phosphates, and carboxylates; cationic surfactants, such as quaternary amines; zwitterionic surfactants, such as betaines, sultaines, and amine oxides; and non-ionic surfactants, such as alkoxylates, and polyhydroxy fatty acid esters.

The use of alkoxylates, i.e., poly(ethylene glycol) or poly(propylene glycol) moieties, is common in several classes of surfactants. These include alkyl phenol ethoxylates and propoxylates, such as nonylphenol ethoxylates, aliphatic alcohol ethoxylates such as fatty alcohol ethoxylates and propoxylates, such as cetyl propoxylate, fatty acid ethoxylates and propoxylates, fatty amine ethoxylates and propoxylates, monoalkanolamide ethoxylates, sorbitan ester ethoxylates, ethoxylated glucosides, and glycerol esters (such as glycerol propoxylate), as well as polyether polymers such as poly(ethylene oxide), poly(propylene oxide) and ethylene oxide/propylene oxide copolymers.

Many alkoxylated surfactants are coming under increased scrutiny because of their toxicity, or for their lack of biodegradability resulting in environmental persistence. For example, nonylphenol ethoxylates, which were once very common in detergents, textile manufacturing and drilling mud, have been banned in Europe since 2005 due to concerns over environmental toxicity and persistence. Yet, in 2013, nonylphenol ethoxylates still accounted for almost half of global nonionic surfactant production, despite increasing calls for prohibition at the international level.

Thus, there is an urgent need for new alkoxylated surfactants, especially surfactants with improved stability, improved biodegradability, and/or improved environmental impact. It would be especially advantageous to have new surfactants sourced from renewable resources.

Terpene alcohols such as citronellol are renewable resources. Citronellol may be sourced naturally from such plant species as citronella grass, or prepared semi-synthetically by hydrogenation of geraniol or nerol, themselves natural resources derived from, respectively, geranium grass, and lemongrass. Geraniol and nerol and other related terpenes can also be derived from the pyrolysis products of beta-pinene, which is widely available from numerous botanical families (e.g., cumin, hemp, hops, cannabis, cluster pine, and *Clausena anisata*).

Terpene alcohol derivatives include polymers and oligomers of terpene alcohols. For example, citronellol has been formed into useful oligomeric and polymeric products having the following structure:

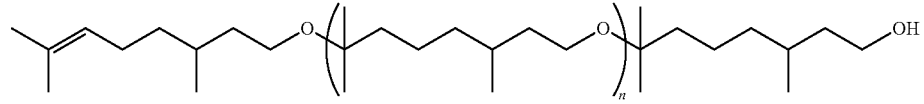

wherein n is an integer from 0 to 20 (e.g., 0-3). Dimers, trimers, and other oligomers of citronellol have been described. See, e.g., US2017/0283553, US2020/0165383, and US2020/0392287, the contents of each of which are hereby incorporated by reference in their entireties. One of the benefits of this class of polymers is the reversibility of the polymerization chemistry which creates them from citronellol. As a result, these polyether polymers are biodegradable, reverting to citronellol naturally. Alkoxylated polymers based on polycitronellol would thus also be expected to be biodegradable, providing a much more environmentally friendly and renewable-resource based

BRIEF SUMMARY OF THE INVENTION

In a first aspect, the present disclosure provides citronellol and polycitronellol alkoxylate surfactants, derived from citronellol monomer or polycitronellol oligomers and derivatives thereof. These compounds are useful in numerous types of compositions, and numerous roles. For example, these compounds may be used as wetting agents, detergents, soaps, emulsifiers, foaming agents, dispersants, buffers, preservatives, and are especially useful as ingredients in personal care compositions, cosmetic compositions, food compositions, and crop care compositions.

In a second aspect, the present disclosure provides a method of preparing such compounds.

In a third aspect, the present disclosure provides compositions and products comprising such compounds. In some embodiments, said compounds are useful in a variety of applications, including as or in cosmetics, soaps, hair care products, fragrances, sunscreens, household cleaning products (e.g., laundry detergents), plastic additives, paints, coatings, lubricants, surfactants, insecticides, and herbicides.

DETAILED DESCRIPTION OF THE INVENTION

As used herein, the term "polycitronellol" refers to a polymer having the following structure, saturated or unsaturated:

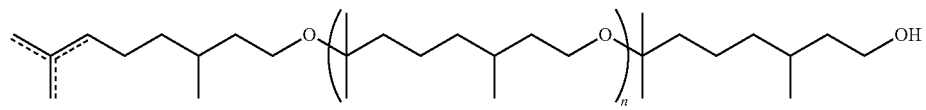

wherein n is an integer from 0 to 20 (e.g., 0-3). While other polymeric derivatives of citronellol may be possible (i.e., having a different structure or nature of connectivity), these are not embraced by the term "polycitronellol" as used herein. The polycitronellol polymers described herein are derived from polymerization of the alcohol groups of citronellol with the alkene groups by an alkene addition reaction. These polymers can undergo a depolymerization based on an elimination mechanism, providing alcohol and alkene products.

In a first embodiment of the first aspect, the present disclosure provides a compound (Compound 1A) of the general formula (I-A), or a compound (Compound 1B) of the general formula (I-B):

Formula (I-A)

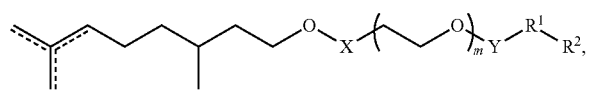

Formula (I-B)

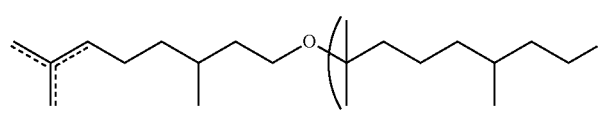

each in free or salt form, wherein:
n is an integer from 0-20 (e.g., 0-10);
m is an integer from 1-100 (e.g., 25-75);
X is selected from a bond, $CH_2$, $CH_2CH_2$, $CH_2C(O)$—, —$CH_2CH_2C(O)$—, $CH_2C(O)O$—, —$CH_2CH_2C(O)O$—, —C(O)—, —C(O)—O—, —C(O)—N(R)—, —S(O)—, —$S(O_2)$—, —$S(O_2)$—O—, and —$S(O_2)$—N(R)—;
Y is selected from $CH_2$, $CH_2CH_2$, —C(O)—, —C(O)—O—, —C(O)—N(R)—, —S(O)—, —$S(O_2)$—, —$S(O_2)$—O—, and —$S(O_2)$—N(R)—;
R is selected from H and $C_1$-$C_6$ alkyl (e.g., methyl) optionally substituted by one or more OH;
$R^1$ is selected from a bond, $C_1$-$C_{20}$ alkyl, $C_2$-$C_{20}$ alkenyl, and $C_6$-$C_{20}$ aryl;
$R^2$ is selected from H, OH, $NH_2$, $NH(C_1$-$C_{12}$ alkyl), $N(C_1$-$C_{12}$ alkyl)($C_1$-$C_{12}$ alkyl), —COOH, $C_1$-$C_6$ alkyl, —O—$C_1$-$C_{12}$ alkyl, —O—$C_6$-$C_{20}$ aryl, —C(O)—$C_1$-$C_{12}$ alkyl, —C(O)—$C_6$-$C_{20}$ aryl, —O—C(O)—$C_1$-$C_{12}$ alkyl, —O—C(O)—$C_6$-$C_{20}$ aryl, —C(O)—O—$C_1$-$C_{12}$ alkyl, —C(O)—O—$C_6$-$C_{20}$ aryl, —O—C(O)—O—$C_1$-$C_{12}$ alkyl, —O—C(O)—O—$C_6$-$C_{20}$ aryl, —C(O)—$NH_2$, —C(O)—NH($C_1$-$C_{12}$ alkyl), —C(O)—N($C_1$-$C_{12}$ alkyl)$_2$, —C(O)—NH-aryl, —O—C(O)—NH($C_1$-$C_{12}$ alkyl), —O—C(O)—N($C_1$-$C_{12}$ alkyl)$_2$, —O—C(O)—NH-aryl, —$SO_3H$, —$SO_2NH_2$, —S(O)—$C_1$-$C_{12}$ alkyl, —S(O)—$C_6$-$C_{20}$ aryl, —$S(O)_2$—$C_1$-$C_{12}$ alkyl, —$S(O)_2$—$C_6$-$C_{20}$ aryl, —O—$S(O)_2$—$C_1$-$C_{12}$ alkyl, —O—$S(O)_2$—$C_6$-$C_{20}$ aryl, —$S(O)_2$—O—$C_1$-$C_{12}$ alkyl, —$S(O)_2$—O—$C_6$-$C_{20}$ aryl, —$S(O)_2$—NH($C_1$-$C_{12}$ alkyl), —$S(O)_2$—N($C_1$-$C_{12}$ alkyl)$_2$, —O—$S(O)_2$—OH, —O—$P(O)_2$(OH), and —P(O)(OH)$_2$;

wherein each of said $C_1$-$C_{12}$ alkyl and $C_6$-$C_{20}$ aryl moieties, are independently optionally further substituted by one or more groups selected from halo (—F, —Cl, —Br, or —I), —CN, OH, $NH_2$, NH($C_1$-$C_{12}$ alkyl), N($C_1$-$C_{12}$ alkyl)($C_1$-$C_{12}$ alkyl), —COOH, —O—$C_1$-$C_{12}$ alkyl, —C(O)—$C_1$-$C_{12}$ alkyl, —O—C(O)—$C_1$-$C_{12}$ alkyl, —C(O)—O—$C_1$-$C_{12}$ alkyl, $SO_3H$, —$SO_2NH_2$, —O—$S(O)_2$—OH, —O—$P(O)_2$(OH), and —P(O)(OH)$_2$.

In further embodiments of the first aspect, the present disclosure provides as follows:
1.1 The compound of Formula I-A.
1.2 The compound of Formula I-B.
1.3 Compound 1.2, wherein n is an integer from 0-10, e.g., 0-8, or 0-6, or 0-5, or any of 0, 1, 2, 3, or 4.
1.4 Compound 1.2, wherein n is 0, 1, 2 or 3.
1.5 Compound 1.2, wherein n is 0.
1.6 Compound 1.2, wherein n is 1.
1.7 Any one of compounds 1.1-1.6, wherein m is an integer from 1-75, e.g., 1-25, 25-50, 50-75, 25-75, 1-10, 11-20, 21-30, 31-40, 41-50, 51-60, 61-75, or any combination thereof.
1.8 Any one of compounds 1.1-1.7, wherein X is selected from a bond, $CH_2$, —C(O)—, —C(O)—O—, and —C(O)—N(R)—.
1.9 Any one of compounds 1.1-1.7, wherein X is selected from —S(O)—, —$S(O_2)$—, —$S(O_2)$—O—, and —$S(O_2)$—N(R)—.
1.10 Any one of compounds 1.1-1.7, wherein X is selected from a bond, $CH_2$, —C(O)—, and —C(O)—O—.
1.11 Any one of compounds 1.1-1.7, wherein X is a bond.

1.12 Any one of compounds 1.1-1.11, wherein Y is selected from CH$_2$, CH$_2$CH$_2$, —C(O)—, —C(O)—O—, and —C(O)—N(R)—.

1.13 Any one of compounds 1.1-1.11, wherein Y is selected from —S(O)—, —S(O$_2$)—, —S(O$_2$)—O—, and —S(O$_2$)—N(R)—.

1.14 Any one of compounds 1.1-1.11, wherein Y is selected from CH$_2$, CH$_2$CH$_2$, and —C(O)—.

1.15 Any one of compounds 1.1-1.11, wherein Y is selected from CH$_2$ and CH$_2$CH$_2$.

1.16 Any one of compounds 1.1-1.13, wherein R is H.

1.17 Any one of compounds 1.1-1.13, wherein R is C$_1$-C$_6$ alkyl (e.g., methyl, ethyl, propyl).

1.18 Any one of compounds 1.1-1.13, wherein R is C$_1$-C$_6$ alkyl substituted by one or more OH, e.g., R is selected from hydroxyethyl, hydroxypropyl, hydroxybutyl, hydroxypentyl, and hydroxyhexyl.

1.19 Compound 1.18, wherein R is selected from —CH$_2$CH$_2$OH, —CH(OH)CH$_3$, —CH(OH)CH$_2$(OH), —CH$_2$CH$_2$CH$_2$OH, —CH$_2$CH(OH)CH$_3$, —CH(OH)CH$_2$CH$_3$, —CH$_2$CH(OH)CH$_2$OH, —CH(OH)CH$_2$CH$_2$OH, —CH(OH)CH(OH)CH$_3$, and —CH(OH)CH(OH)CH$_2$OH.

1.20 Any one of compounds 1.1-1.19, wherein R$^1$ is selected from a bond, C$_1$-C$_{20}$ alkyl, and C$_2$-C$_{20}$ alkenyl.

1.21 Compound 1.20, wherein R$^1$ is a C$_{6-18}$ alkyl, e.g., C$_{6-12}$ alkyl, C$_{12-18}$ alkyl, C$_{6-10}$ alkyl, C$_{10-14}$ alkyl, or C$_{14-18}$ alkyl.

1.22 Compound 1.20, wherein R$^1$ is a C$_{6-18}$ alkenyl, e.g., C$_{6-12}$ alkenyl, C$_{12-18}$ alkenyl, C$_{6-10}$ alkenyl, C$_{10-14}$ alkenyl, or C$_{14-18}$ alkenyl, each of which may optionally be monounsaturated or di-unsaturated.

1.23 Compound 1.20, wherein R$^1$ is a C$_{1-3}$ alkyl, e.g., CH$_2$ or CH$_2$CH$_2$.

1.24 Any one of compounds 1.1-1.23, wherein R$^2$ is selected from H, OH, NH$_2$, NH(C$_1$-C$_{12}$ alkyl), N(C$_1$-C$_{12}$ alkyl)(C$_1$-C$_{12}$ alkyl), and —COOH.

1.25 Any one of compounds 1.1-1.23, wherein R$^2$ is selected from C$_1$-C$_6$ alkyl, —O—C$_1$-C$_{12}$alkyl, —O—C$_6$-C$_{20}$ aryl, —C(O)—C$_1$-C$_{12}$ alkyl, —C(O)—C$_6$-C$_{20}$ aryl, —O—C(O)—C$_1$-C$_{12}$ alkyl, —O—C(O)—C$_6$-C$_{20}$ aryl, —C(O)—O—C$_1$-C$_{12}$ alkyl, —C(O)—O—C$_6$-C$_{20}$ aryl, —O—C(O)—O—C$_1$-C$_{12}$ alkyl, —O—C(O)—O—C$_6$-C$_{20}$ aryl, —C(O)—NH$_2$, —C(O)—NH(C$_1$-C$_{12}$ alkyl), —C(O)—N(C$_1$-C$_{12}$ alkyl)$_2$, —C(O)—NH-aryl, —O—C(O)—NH(C$_1$-C$_{12}$ alkyl), —O—C(O)—N(C$_1$-C$_{12}$ alkyl)$_2$, and —O—C(O)—NH-aryl.

1.26 Any one of compounds 1.1-1.23, wherein R$^2$ is selected from —SO$_3$H, —SO$_2$NH$_2$, —S(O)—C$_1$-C$_{12}$ alkyl, —S(O)—C$_6$-C$_{20}$ aryl, —S(O)$_2$—C$_1$-C$_{12}$ alkyl, —S(O)$_2$—C$_6$-C$_{20}$ aryl, —O—S(O)$_2$—C$_1$-C$_{12}$ alkyl, —O—S(O)$_2$—C$_6$-C$_{20}$ aryl, —S(O)$_2$—O—C$_1$-C$_{12}$ alkyl, —S(O)$_2$—O—C$_6$-C$_{20}$ aryl, —S(O)$_2$, NH(C$_1$-C$_{12}$ alkyl), —S(O)$_2$—N(C$_1$-C$_{12}$ alkyl)$_2$, —O—S(O)$_2$—OH, —O—P(O)$_2$(OH), and —P(O)(OH)$_2$.

1.27 Any one of compounds 1.1-1.23, wherein R$^2$ is selected from C$_1$-C$_6$ alkyl, —O—C$_1$-C$_{12}$ alkyl, —C(O)—C$_1$-C$_{12}$ alkyl, —O—C(O)—C$_1$-C$_{12}$ alkyl, —C(O)—O—C$_1$-C$_{12}$ alkyl, —O—C(O)—O—C$_1$-C$_{12}$ alkyl, —C(O)—NH$_2$, —C(O)—NH(C$_1$-C$_{12}$ alkyl), —C(O)—N(C$_1$-C$_{12}$ alkyl)$_2$, —O—C(O)—NH(C$_1$-C$_{12}$ alkyl), —O—C(O)—N(C$_1$-C$_{12}$ alkyl)$_2$, —SO$_3$H, —SO$_2$NH$_2$, —S(O)—C$_1$-C$_{12}$ alkyl, —S(O)$_2$—C$_1$-C$_{12}$ alkyl, —O—S(O)$_2$—C$_1$-C$_{12}$ alkyl, —S(O)$_2$—O—C$_1$-C$_{12}$ alkyl, —S(O)$_2$, NH(C$_1$-C$_{12}$ alkyl), —S(O)$_2$—N(C$_1$-C$_{12}$ alkyl)$_2$, —O—S(O)$_2$—OH, —O—P(O)$_2$(OH), and —P(O)(OH)$_2$.

1.28 Any one of compounds 1.1-1.23, wherein R$^2$ is selected from H, OH, NH$_2$, NHCH$_3$, NH(CH$_3$)$_2$, OCH$_3$, —C(O)CH$_3$, —O—C(O)—CH$_3$, —COOH, —SO$_3$H, —O—S(O)$_2$—OH, —O—P(O)$_2$(OH), and —P(O)(OH)$_2$.

1.29 Any one of compounds 1.1-1.28, wherein the alkyl and/or aryl moieties of R$^2$ are each unsubstituted.

1.30 Any one of compounds 1.1-1.28, wherein the alkyl and/or aryl moieties of R$^2$ are each independently further substituted by one or more groups selected from halo (—F, —Cl, —Br, or —I), —CN, OH, NH$_2$, NH(C$_1$-C$_{12}$ alkyl), N(C$_1$-C$_{12}$ alkyl)(C$_1$-C$_{12}$ alkyl), —COOH, —O—C$_1$-C$_{12}$ alkyl, —C(O)—C$_1$-C$_{12}$ alkyl, —O—C(O)—C$_1$-C$_{12}$ alkyl, —C(O)—O—C$_1$-C$_{12}$ alkyl, —SO$_3$H, —SO$_2$NH$_2$, —O—S(O)$_2$—OH, —O—P(O)$_2$(OH), and —P(O)(OH)$_2$.

1.31 Any one of compounds 1.1-1.28, wherein the alkyl and/or aryl moieties of R$^2$ are each independently further substituted by one or more groups selected from halo (—F, —Cl, —Br, or —I), —CN, OH, NH$_2$, NH(C$_1$-C$_{12}$ alkyl), N(C$_1$-C$_{12}$ alkyl)(C$_1$-C$_{12}$ alkyl), —COOH, —SO$_3$H, —SO$_2$NH$_2$, —O—S(O)$_2$—OH, —O—P(O)$_2$(OH), and —P(O)(OH)$_2$.

1.32 Any one of compounds 1.1-1.28, wherein the alkyl and/or aryl moieties of R$^2$ are each independently further substituted by one or more groups selected from halo (—F, —Cl, —Br, or —I), —OH, NH$_2$, —COOH, —SO$_3$H, —SO$_2$NH$_2$, —O—S(O)$_2$—OH, —O—P(O)$_2$(OH), and —P(O)(OH)$_2$.

1.33 Any one of compounds 1.1-1.28, wherein the alkyl and/or aryl moieties of R$^2$ are each independently further substituted by one or more groups selected from halo (—F, —Cl, —Br, or —I), —OH, NH$_2$, —COOH, and —SO$_3$H.

1.34 Any one of compounds 1.1-1.28, wherein the alkyl and/or aryl moieties of R$^2$ are each independently further substituted by one or more OH.

1.35 Any one of compounds 1.1-1.23, wherein R$^2$ is selected from C$_1$-C$_6$ alkyl, —O—C$_1$-C$_6$alkyl, —C(O)—C$_1$-C$_6$ alkyl, —O—C(O)—C$_1$-C$_6$ alkyl, —C(O)—O—C$_1$-C$_6$ alkyl, —O—C(O)—O—C$_1$-C$_6$ alkyl, wherein each of said alkyl is optionally substituted by one or more OH.

1.36 Any one of compounds 1.1-1.23, wherein R$^2$ is selected from —O—C$_1$-C$_3$ alkyl, —C(O)—C$_1$-C$_3$ alkyl, —O—C(O)—C$_1$-C$_3$ alkyl, —C(O)—O—C$_1$-C$_3$ alkyl, —O—C(O)—O—C$_1$-C$_3$ alkyl, wherein each of said alkyl is optionally substituted by one or more OH.

1.37 Compound 1.36, wherein each of said C$_1$-C$_3$ alkyl is selected from —CH$_2$CH$_2$OH, —CH(OH)CH$_3$, —CH(OH)CH$_2$(OH), —CH$_2$CH$_2$CH$_2$OH, —CH$_2$CH(OH)CH$_3$, —CH(OH)CH$_2$CH$_3$, —CH$_2$CH(OH)CH$_2$OH, —CH(OH)CH$_2$CH$_2$OH, —CH(OH)CH(OH)CH$_3$, and —CH(OH)CH(OH)CH$_2$OH.

1.38 Compound 1.37, wherein each of said C$_1$-C$_3$ alkyl is selected from —CH$_2$CH$_2$OH, —CH(OH)CH$_2$(OH), —CH$_2$CH(OH)CH$_3$, —CH$_2$CH(OH)CH$_2$OH, and —CH(OH)CH(OH)CH$_2$OH.

1.39 Compound 1.37, wherein R$^2$ is selected from —OCH$_2$CH$_2$OH, —OCH$_2$CH(OH)CH$_3$, —OCH$_2$CH(OH)CH$_2$OH, —(CO)—CH$_2$CH$_2$OH, —(CO)—CH$_2$CH(OH)CH$_3$, —C(O)—CH$_2$CH(OH)CH$_2$OH, —O(CO)—CH$_2$CH$_2$OH, —O(CO)—CH$_2$CH(OH)CH$_3$, —OC(O)—CH$_2$CH(OH)CH$_2$OH, —(CO)—O—CH$_2$CH$_2$OH, —(CO)—O—CH$_2$CH(OH)CH$_3$, and —C(O)—O—CH$_2$CH(OH)CH$_2$OH.

1.40 Any preceding compound, wherein:
X is a bond, and Y is H; or
X is a bond, Y is —C(O)—, $R^1$ is $CH_2$ or $CH_2CH_2$, and $R^2$ is —COOH; or
X is a bond, Y is —C(O)—, $R^1$ is $CH_2$ or $CH_2CH_2$, and $R^2$ is —$SO_3H$ or —O—$S(O)_2OH$; or
X is a bond, Y is —$S(O)_2$—, $R^1$ is a bond, and $R^2$ is OH; or
X is a bond, Y is —C(O)—, $R^1$ is a bond, and $R^2$ is $CH_2CH_2OH$; or
X is a bond, Y is —C(O)—, $R^1$ is a bond, and $R^2$ is $CH_2CH(OH)CH_2OH$; or
X is a bond, Y is —C(O)—, $R^1$ is a bond, and $R^2$ is $CH_3$.

1.41 Any preceding compound which comprises any group —COOH, —$SO_3H$, —O—$S(O)_2$—OH, —O—P$(O)_2(OH)$, or —P(O)(OH)$_2$, wherein said group is in the form of a salt, e.g., an alkali metal salt (e.g., lithium, sodium or potassium salt), or an alkaline earth metal salt (e.g., magnesium or calcium salt).

1.42 Any preceding compound which comprises any basic amine group (e.g., —$NH_2$), wherein said group is in the form of an acid addition salt, e.g., a salt with strong Bronsted acid (e.g., hydrochloride, sulfate, phosphate salt).

1.43 Any preceding compound wherein the terminal groups of the compound of Formula I-A or I-B are each:

1.44 Any preceding compound wherein the terminal groups of the compound of Formula I-A or I-B are each:

In a second embodiment of the first aspect, the present disclosure provides a compound (Compound 2A) of the general formula (II-A), or a compound (Compound 2B) of the general formula (II-B):

Formula (II-A)

Formula (II-B)

each in free or salt form, wherein:
n is an integer from 0-20 (e.g., 0-10);
m is an integer from 1-100 (e.g., 25-75);
X is selected from a bond, $CH_2$, $CH_2CH_2$, $CH_2C(O)$—, —$CH_2CH_2C(O)$—, $CH_2C(O)O$—, —$CH_2CH_2C(O)$O—, —C(O)—, —C(O)—O—, —C(O)—N(R)—, —S(O)—, —$S(O_2)$—, —$S(O_2)$—O—, and —$S(O_2)$—N(R)—;
Y is selected from $CH_2CH_2$, —C(O)—, —$CH_2CH_2$—C(O)—, —$CH_2CH_2$—C(O)—O—, —S(O)—, or —$S(O_2)$—;
R is selected from H and $C_1$-$C_6$ alkyl (e.g., methyl) optionally substituted by one or more OH;
each $R^3$ is independently selected from H, $C_1$-$C_{20}$ alkyl, $C_2$-$C_{20}$ alkenyl, —C(O)—$C_1$-$C_{20}$ alkyl, —C(O)—$C_2$-$C_{20}$ alkenyl, —$(CH_2CH_2O)_m$—$CH_2CH_2OH$, —$(CH_2CH_2O)_m$—$CH_2CH_2O$—$C_1$-$C_{20}$ alkyl, —$(CH_2CH_2O)_m$—$CH_2CH_2O$—$C_2$-$C_{20}$ alkenyl, —$(CH_2CH_2O)_m$—$CH_2CH_2O$—C(O)—$C_1$-$C_{20}$ alkyl, —$(CH_2CH_2O)_m$—$CH_2CH_2O$—C(O)—$C_2$-$C_{20}$ alkenyl, —$(CH_2CH(CH_3)O)_m$—$CH_2CH(CH_3)OH$, —$(CH_2CH(CH_3)O)_m$—$CH_2CH(CH_3)O$—$C_1$-$C_{20}$ alkyl, —$(CH_2CH(CH_3)O)_m$—$CH_2CH(CH_3)O$—$C_2$-

$C_{20}$ alkenyl, —$(CH_2CH(CH_3)O)_m$—$CH_2CH(CH_3)O$—$C(O)$—$C_1$-$C_{20}$ alkyl, and —$(CH_2CH(CH_3)O)_m$—$CH_2CH(CH_3)O$—$C(O)$—$C_2$-$C_{20}$ alkenyl, —$CH_2CH_2OH$, —$CH_2CH(CH_3)OH$, —$CH_2COOH$, —$CH_2CH_2COOH$, —$S(O)_2$—$OH$, and —$P(O)_2(OH)$, or one or both $R^3$ is a structure having the formula:

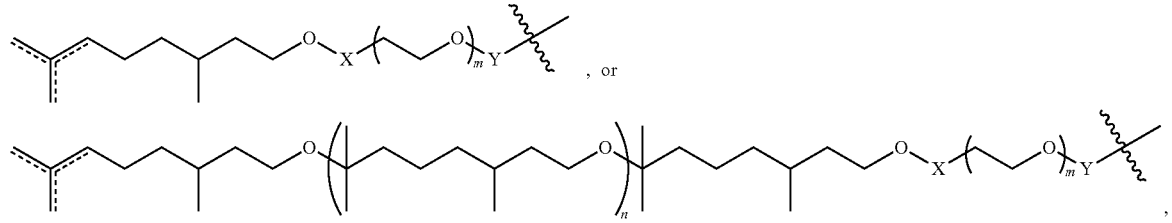, or wherein X, Y, n and m are each independently as defined herein above.

In further embodiments of the first aspect, the present disclosure provides as follows:

2.1 The compound of Formula II-A.
2.2 The compound of Formula II-B.
2.3 Compound 2.2, wherein n is an integer from 0-10, e.g., 0-8, or 0-6, or 0-5, or any of 0, 1, 2, 3, or 4.
2.4 Compound 2.2, wherein n is 0, 1, 2 or 3.
2.5 Compound 2.2, wherein n is 0.
2.6 Compound 2.2, wherein n is 1.
2.7 Any one of compounds 2.1-2.6, wherein m is an integer from 1-75, e.g., 1-25, 25-50, 50-75, 25-75, 1-10, 11-20, 21-30, 31-40, 41-50, 51-60, 61-75, or any combination thereof.
2.8 Any one of compounds 2.1-2.7, wherein X is selected from $CH_2$, —$C(O)$—, —$C(O)$—$O$—, and —$C(O)$—$N(R)$—.
2.9 Any one of compounds 2.1-2.7, wherein X is selected from —$S(O)$—, —$S(O_2)$—, —$S(O_2)$—$O$—, and —$S(O_2)$—$N(R)$—.
2.10 Any one of compounds 2.1-2.7, wherein X is selected from a bond, $CH_2$, —$C(O)$—, and —$C(O)$—$O$—.
2.11 Any one of compounds 2.1-2.7, wherein X is a bond.
2.12 Any one of compounds 2.1-2.11, wherein Y is selected from $CH_2CH_2$, —$C(O)$—, —$CH_2CH_2$—$C(O)$—, and —$CH_2CH_2$—$C(O)$—$O$—.
2.13 Any one of compounds 2.1-2.11, wherein Y is selected from —$S(O)$—, and —$S(O_2)$—.
2.14 Any one of compounds 2.1-2.11, wherein Y is $CH_2CH_2$.
2.15 Any one of compounds 2.1-2.11, wherein Y is —$C(O)$—.
2.16 Any one of compounds 2.1-2.15, wherein R is H.
2.17 Any one of compounds 2.1-2.15, wherein R is $C_1$-$C_6$ alkyl (e.g., methyl, ethyl, propyl).
2.18 Any one of compounds 2.1-2.15, wherein R is $C_1$-$C_6$ alkyl substituted by one or more OH, e.g., R is selected from hydroxyethyl, hydroxypropyl, hydroxybutyl, hydroxypentyl, and hydroxhexyl.
2.19 Compound 2.18, wherein R is selected from —$CH_2CH_2OH$, —$CH(OH)CH_3$, —$CH(OH)CH_2(OH)$, —$CH_2CH_2CH_2OH$, —$CH_2CH(OH)CH_3$, —$CH(OH)CH_2CH_3$, —$CH_2CH(OH)CH_2OH$, —$CH(OH)CH_2CH_2OH$, —$CH(OH)CH(OH)CH_3$, and —$CH(OH)CH(OH)CH_2OH$.

2.20 Any one of compounds 2.1-2.19, wherein $R^3$ is selected from H, $C_1$-$C_{20}$ alkyl, and $C_2$-$C_{20}$ alkenyl.
2.21 Compound 2.20, wherein $R^3$ is a $C_{6-18}$ alkyl, e.g., $C_{6-12}$ alkyl, $C_{12-18}$ alkyl, $C_{6-10}$ alkyl, $C_{10-14}$ alkyl, or $C_{14-18}$ alkyl.
2.22 Compound 2.20, wherein $R^3$ is a $C_{6-18}$ alkenyl, e.g., $C_{6-12}$ alkenyl, $C_{12-18}$ alkenyl, $C_{6-10}$ alkenyl, $C_{10-14}$ alkenyl, or $C_{14-18}$ alkenyl, each of which may optionally be monounsaturated or di-unsaturated.
2.23 Compound 2.20, wherein $R^3$ is a $C_{1-3}$ alkyl, e.g., $CH_2$ or $CH_2CH_2$.
2.24 Any one of compounds 2.1-2.19, wherein $R^3$ is —$C(O)$—$C_1$-$C_{20}$ alkyl or —$C(O)$—$C_2$-$C_{20}$ alkenyl.
2.25 Compound 2.24, wherein $R^3$ is a —$C(O)$—$C_{6-18}$ alkyl, e.g., —$C(O)$—$C_{6-12}$ alkyl, —$C(O)$—$C_{12-18}$ alkyl, —$C(O)$—$C_{6-10}$ alkyl, —$C(O)$—$C_{10-14}$ alkyl, or —$C(O)$—$C_{14-18}$ alkyl.
2.26 Compound 2.24, wherein $R^3$ is a —$C(O)$—$C_{6-18}$ alkenyl, e.g., —$C(O)$—$C_{6-12}$ alkenyl, —$C(O)$—$C_{12-18}$ alkenyl, —$C(O)$—$C_{6-10}$ alkenyl, —$C(O)$—$C_{10-14}$ alkenyl, or —$C(O)$—$C_{14-18}$ alkenyl, each of which may optionally be monounsaturated or di-unsaturated.
2.27 Any one of compounds 2.1-2.19, wherein $R^3$ is —$(CH_2CH_2O)_m$—$CH_2CH_2OH$, wherein m is an integer from 1-75, e.g., 1-25, 25-50, 50-75, 25-75, 1-10, 11-20, 21-30, 31-40, 41-50, 51-60, 61-75, or any combination thereof.
2.28 Any one of compounds 2.1-2.19, wherein $R^3$ is selected from —$(CH_2CH_2O)_m$—$CH_2CH_2O$—$C_1$-$C_{20}$ alkyl, —$(CH_2CH_2O)_m$—$CH_2CH_2O$—$C_2$-$C_{20}$ alkenyl, —$(CH_2CH_2O)_m$—$CH_2CH_2O$—$C(O)$—$C_1$-$C_{20}$ alkyl, and —$(CH_2CH_2O)_m$—$CH_2CH_2O$—$C(O)$—$C_2$-$C_{20}$ alkenyl.
2.29 Compound 2.28, wherein m is an integer from 1-75, e.g., 1-25, 25-50, 50-75, 25-75, 1-10, 11-20, 21-30, 31-40, 41-50, 51-60, 61-75, or any combination thereof.
2.30 Compound 2.28 or 2.29, wherein said $C_1$-$C_{20}$ alkyl is a $C_{6-18}$ alkyl, e.g., $C_{6-12}$ alkyl, $C_{12-18}$ alkyl, $C_{6-10}$ alkyl, $C_{10-14}$ alkyl, or $C_{14-18}$ alkyl.
2.31 Compound 2.28 or 2.29, wherein said $C_2$-$C_{20}$ alkenyl is a $C_{6-18}$ alkenyl, e.g., $C_{6-12}$ alkenyl, $C_{12-18}$ alkenyl, $C_{6-10}$ alkenyl, $C_{10-14}$ alkenyl, or $C_{14-18}$ alkenyl.
2.32 Any one of compounds 2.1-2.19, wherein $R^3$ is:

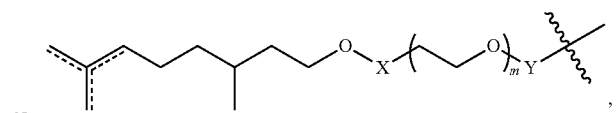, wherein X, Y and m are as defined in any of 2.1-2.19.

2.33 Any one of compounds 2.1-2.19, wherein R³ is:

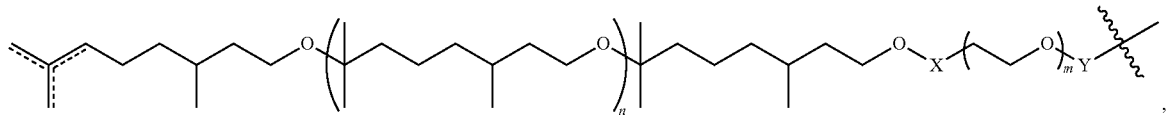

wherein X, Y, n and m are as defined in any of 2.1-2.19.
  2.34 Any one of compounds 2.1-2.19, wherein R³ is —CH₂CH₂OH, —CH₂CH(CH₃)OH, —CH₂COOH, —CH₂CH₂COOH, —S(O)₂—OH, or —P(O)₂(OH).
  2.35 Any preceding compound, wherein:
    X is a bond, and Y is CH₂CH₂; or
    X is a bond, and Y is —C(O)—; or
    X is a bond, and Y is —CH₂CH₂—C(O)—; or
    X is a bond, and Y is —S(O)₂—.
  2.36 Compound 2.35, wherein R³ is H.
  2.37 Compound 2.35, wherein R³ is —CH₂CH₂OH, —CH₂CH(CH₃)OH, —CH₂COOH, —CH₂CH₂COOH, —S(O)₂—OH, or —P(O)₂(OH).
  2.38 Compound 2.35, wherein the compound is the compound of Formula II-A and wherein R³ is:

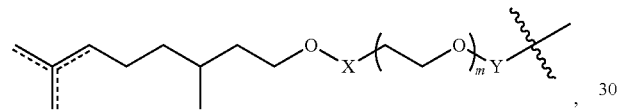

wherein X, Y and m are as defined for the compound of Formula II-A (i.e., all values of X, Y and m are the same in the compound).
  2.39 Compound 2.34, wherein the compound is the compound of Formula II-B and wherein R³ is:

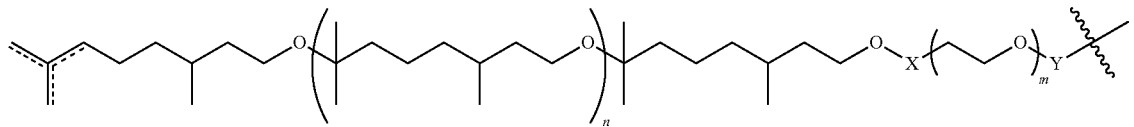

wherein X, Y, n, and m are as defined for the compound of Formula II-A (i.e., all values of X, Y, n, and m are the same in the compound).
  2.40 Any preceding compound which comprises any group —COOH, —S(O)₂—OH, or —P(O)₂(OH), wherein said group is in the form of a salt, e.g., an alkali metal salt (e.g., lithium, sodium or potassium salt), or an alkaline earth metal salt (e.g., magnesium or calcium salt).
  2.41 Any preceding compound which comprises any basic amine group (e.g., —NH₂), wherein said group is in the form of an acid addition salt, e.g., a salt with strong Bronsted acid (e.g., hydrochloride, sulfate, phosphate salt). P 2.42 Any preceding compound wherein the terminal groups

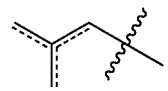

of the compound of Formula II-A or II-B are each:

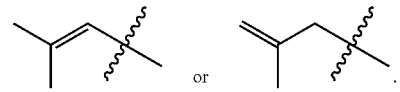

2.43 Any preceding compound wherein the terminal groups

of the compound of Formula II-A or II-B are each:

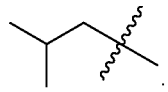 [SMILES: *CC(C)C]

In a third embodiment of the first aspect, the present disclosure provides a compound (Compound 3A) of the general formula (III-A), or a compound (Compound 3B) of the general formula (III-B):

Formula (III-A)

[Chemical structure showing: terpenoid chain—O—X—(O-repeat unit)ₘ—Y—R¹/R²]

Formula (III-B)

[Chemical structure showing: terpenoid chain—O—(repeating unit)ₙ—O—X—(O-repeat)ₘ—Y—R¹/R²]

each in free or salt form, wherein:
- n is an integer from 0-20 (e.g., 0-10);
- m is an integer from 1-100 (e.g., 25-75);
- X is selected from a bond, $CH_2$, $CH_2CH_2$, $CH_2C(O)$—, —$CH_2CH_2C(O)$—, $CH_2C(O)O$—, $CH_2CH_2C(O)O$—, —C(O)—, —C(O)—O—, —C(O)—N(R)—, —S(O)—, —S(O)_2$—, —$S(O)_2$—O—, and —$S(O)_2$—N(R)—;
- Y is selected from $CH_2$, $CH_2CH_2$, —C(O)—, —C(O)—O—, —C(O)—N(R)—, —S(O)—, —$S(O)_2$—, —$S(O)_2$—O—, and —$S(O)_2$—N(R)—;
- R is selected from H and $C_1$-$C_6$ alkyl (e.g., methyl) optionally substituted by one or more OH;
- $R^1$ is selected from a bond, $C_1$-$C_{20}$ alkyl, $C_2$-$C_{20}$ alkenyl, and $C_6$-$C_{20}$ aryl;
- $R^2$ is selected from H, OH, $NH_2$, $NH(C_1$-$C_{12}$ alkyl), $N(C_1$-$C_{12}$ alkyl)($C_1$-$C_{12}$ alkyl), —COOH, $C_1$-$C_6$ alkyl, —O—$C_1$-$C_{12}$ alkyl, —O—$C_6$-$C_{20}$ aryl, —C(O)—$C_1$-$C_{12}$ alkyl, —C(O)—$C_6$-$C_{20}$ aryl, —O—C(O)—$C_1$-$C_{12}$ alkyl, —O—C(O)—$C_6$-$C_{20}$ aryl, —C(O)—O—$C_1$-$C_{12}$ alkyl, —C(O)—O—$C_6$-$C_{20}$ aryl, —O—C(O)—O—$C_1$-$C_{12}$ alkyl, —O—C(O)—O—$C_6$-$C_{20}$ aryl, —C(O)—$NH_2$, —C(O)—NH($C_1$-$C_{12}$ alkyl), —C(O)—N($C_1$-$C_{12}$ alkyl)$_2$, —C(O)—NH-aryl, —O—C(O)—NH($C_1$-$C_{12}$ alkyl), —O—C(O)—N($C_1$-$C_{12}$ alkyl)$_2$, —O—C(O)—NH-aryl, —$SO_3H$, —$SO_2NH_2$, —S(O)—$C_1$-$C_{12}$ alkyl, —S(O)—$C_6$-$C_{20}$ aryl, —$S(O)_2$—$C_1$-$C_{12}$ alkyl, —$S(O)_2$—$C_6$-$C_{20}$ aryl, —O—$S(O)_2$—$C_1$-$C_{12}$ alkyl, —O—$S(O)_2$—$C_6$-$C_{20}$ aryl, —$S(O)_2$—O—$C_1$-$C_{12}$ alkyl, —$S(O)_2$—O—$C_6$-$C_{20}$ aryl, —$S(O)_2$—NH($C_1$-$C_{12}$ alkyl), —$S(O)_2$—N($C_1$-$C_{12}$ alkyl)$_2$, —O—$S(O)_2$—OH, —O—$P(O)_2(OH)$, and —$P(O)(OH)_2$;
- wherein each of said $C_1$-$C_{12}$ alkyl and $C_6$-$C_{20}$ aryl moieties, are independently optionally further substituted by one or more groups selected from halo (—F, —Cl, —Br, or —I), —CN, OH, $NH_2$, $NH(C_1$-$C_{12}$ alkyl), $N(C_1$-$C_{12}$ alkyl)($C_1$-$C_{12}$ alkyl), —COOH, —O—$C_1$-$C_{12}$ alkyl, —C(O)—$C_1$-$C_{12}$ alkyl, —O—C(O)—$C_1$-$C_{12}$ alkyl, —C(O)—O—$C_1$-$C_{12}$ alkyl, $SO_3H$, —$SO_2NH_2$, —O—$S(O)_2$—OH, —O—$P(O)_2(OH)$, and —$P(O)(OH)_2$.

In further embodiments of the first aspect, the present disclosure provides as follows:

3.1 The compound of Formula III-A.
3.2 The compound of Formula III-B.
3.3 Compound 3.2, wherein n is an integer from 0-10, e.g., 0-8, or 0-6, or 0-5, or any of 0, 1, 2, 3, or 4.
3.4 Compound 3.2, wherein n is 0, 1, 2 or 3.
3.5 Compound 3.2, wherein n is 0.
3.6 Compound 3.2, wherein n is 1.
3.7 Any one of compounds 3.1-3.6, wherein m is an integer from 1-75, e.g., 1-25, 25-50, 50-75, 25-75, 1-10, 11-20, 21-30, 31-40, 41-50, 51-60, 61-75, or any combination thereof.
3.8 Any one of compounds 3.1-3.7, wherein X is selected from a bond, $CH_2$, —C(O)—, —C(O)—O—, and —C(O)—N(R)—.
3.9 Any one of compounds 3.1-3.7, wherein X is selected from —S(O)—, —$S(O)_2$—, —$S(O)_2$—O—, and —$S(O)_2$—N(R)—.
3.10 Any one of compounds 3.1-3.7, wherein X is selected from a bond, $CH_2$, —C(O)—, and —C(O)—O—.
3.11 Any one of compounds 3.1-3.7, wherein X is a bond.
3.12 Any one of compounds 3.1-3.11, wherein Y is selected from $CH_2$, $CH_2CH_2$, —C(O)—, —C(O)—O—, and —C(O)—N(R)—.
3.13 Any one of compounds 3.1-3.11, wherein Y is selected from —S(O)—, —$S(O)_2$—, —$S(O)_2$—O—, and —$S(O)_2$—N(R)—.
3.14 Any one of compounds 3.1-3.11, wherein Y is selected from $CH_2$, $CH_2CH_2$, and —C(O)—.
3.15 Any one of compounds 3.1-3.11, wherein Y is selected from $CH_2$ and $CH_2CH_2$.
3.16 Any one of compounds 3.1-3.13, wherein R is H.
3.17 Any one of compounds 3.1-3.13, wherein R is $C_1$-$C_6$ alkyl (e.g., methyl, ethyl, propyl).
3.18 Any one of compounds 3.1-3.13, wherein R is $C_1$-$C_6$ alkyl substituted by one or more OH, e.g., R is selected from hydroxyethyl, hydroxypropyl, hydroxybutyl, hydroxypentyl, and hydroxhexyl.
3.19 Compound 3.18, wherein R is selected from —$CH_2CH_2OH$, —CH(OH)$CH_3$, —CH(OH)$CH_2$(OH), —$CH_2CH_2CH_2OH$, —$CH_2CH(OH)CH_3$, —CH(OH)$CH_2CH_3$, —$CH_2CH(OH)CH_2OH$, —CH(OH)$CH_2CH_2OH$, —CH(OH)CH(OH)$CH_3$, and —CH(OH)CH(OH)$CH_2OH$.
3.20 Any one of compounds 3.1-3.19, wherein $R^1$ is selected from a bond, $C_1$-$C_{20}$ alkyl, and $C_2$-$C_{20}$ alkenyl.
3.21 Compound 3.20, wherein $R^1$ is a $C_{6-18}$ alkyl, e.g., $C_{6-12}$ alkyl, $C_{12-18}$ alkyl, $C_{6-10}$ alkyl, $C_{10-14}$ alkyl, or $C_{14-18}$ alkyl.
3.22 Compound 3.20, wherein $R^1$ is a $C_{6-18}$ alkenyl, e.g., $C_{6-12}$ alkenyl, $C_{12-18}$ alkenyl, $C_{6-10}$ alkenyl, $C_{10-14}$ alkenyl, or $C_{14-18}$ alkenyl, each of which may optionally be monounsaturated or di-unsaturated.
3.23 Compound 3.20, wherein $R^1$ is a $C_{1-3}$ alkyl, e.g., $CH_2$ or $CH_2CH_2$.
3.24 Any one of compounds 3.1-3.23, wherein $R^2$ is selected from H, OH, $NH_2$, $NH(C_1$-$C_{12}$ alkyl), $N(C_1$-$C_{12}$ alkyl)($C_1$-$C_{12}$ alkyl), and —COOH.
3.25 Any one of compounds 3.1-3.23, wherein $R^2$ is selected from $C_1$-$C_6$ alkyl, —O—$C_1$-$C_{12}$alkyl, —O—$C_6$-$C_{20}$ aryl, —C(O)—$C_1$-$C_{12}$ alkyl, —C(O)—$C_6$-$C_{20}$ aryl, —O—C(O)—$C_1$-$C_{12}$ alkyl, —O—C(O)—$C_6$-$C_{20}$ aryl, —C(O)—O—$C_1$-$C_{12}$ alkyl, —C(O)—O—$C_6$-$C_{20}$ aryl, —O—C(O)—O—$C_1$-$C_{12}$ alkyl, —O—C (O)—O—$C_6$-$C_{20}$ aryl, —C(O)—$NH_2$, —C(O)—NH($C_1$-$C_{12}$ alkyl), —C(O)—N($C_1$-$C_{12}$ alkyl)$_2$, —C(O)—NH-aryl, —O—C(O)—NH($C_1$-$C_{12}$ alkyl), —O—C(O)—N($C_1$-$C_{12}$ alkyl)$_2$, and —O—C(O)—NH-aryl.

3.26 Any one of compounds 3.1-3.23, wherein $R^2$ is selected from —$SO_3H$, —$SO_2NH_2$, —S(O)—$C_1$-$C_{12}$ alkyl, —S(O)—$C_6$-$C_{20}$ aryl, —$S(O)_2$—$C_1$-$C_{12}$ alkyl, —$S(O)_2$—$C_6$-$C_{20}$ aryl, —O—$S(O)_2$—$C_1$-$C_{12}$ alkyl, —O—$S(O)_2$—$C_6$-$C_{20}$ aryl, —$S(O)_2$—O—$C_1$-$C_{12}$ alkyl, —$S(O)_2$—O—$C_6$-$C_{20}$ aryl, —$S(O)_2$, NH($C_1$-$C_{12}$ alkyl), —$S(O)_2$—N($C_1$-$C_{12}$ alkyl)$_2$, —O—$S(O)_2$—OH, —O—$P(O)_2(OH)$, and —$P(O)(OH)_2$.

3.27 Any one of compounds 3.1-3.23, wherein $R^2$ is selected from $C_1$-$C_6$ alkyl, —O—$C_1$-$C_{12}$alkyl, —C(O)—$C_1$-$C_{12}$ alkyl, —O—C(O)—$C_1$-$C_{12}$ alkyl, —C(O)—O—$C_1$-$C_{12}$ alkyl, —O—C(O)—O—$C_1$-$C_{12}$ alkyl, —C(O)—$NH_2$, —C(O)—NH($C_1$-$C_{12}$ alkyl), —C(O)—N($C_1$-$C_{12}$ alkyl)$_2$, —O—C(O)—NH($C_1$-$C_{12}$ alkyl), —O—C(O)—N($C_1$-$C_{12}$ alkyl)$_2$), —$SO_3H$, —$SO_2NH_2$, —S(O)—$C_1$-$C_{12}$ alkyl, —$S(O)_2$—$C_1$-$C_{12}$ alkyl, —O—$S(O)_2$—$C_1$-$C_{12}$ alkyl, —$S(O)_2$—O—$C_1$-$C_{12}$ alkyl, —$S(O)_2$, NH($C_1$-$C_{12}$ alkyl), —$S(O)_2$—N($C_1$-$C_{12}$ alkyl)$_2$, —O—$S(O)_2$—OH, —O—$P(O)_2(OH)$, and —$P(O)(OH)_2$.

3.28 Any one of compounds 3.1-3.23, wherein $R^2$ is selected from H, OH, $NH_2$, $NHCH_3$, $NH(CH_3)_2$, $OCH_3$, —$C(O)CH_3$, —O—C(O)—$CH_3$, —COOH, —$SO_3H$, —O—$S(O)_2$—OH, —O—$P(O)_2(OH)$, and —$P(O)(OH)_2$.

3.29 Any one of compounds 3.1-3.28, wherein the alkyl and/or aryl moieties of $R^2$ are each unsubstituted.

3.30 Any one of compounds 3.1-3.28, wherein the alkyl and/or aryl moieties of $R^2$ are each independently further substituted by one or more groups selected from halo (—F, —Cl, —Br, or —I), —CN, OH, $NH_2$, NH($C_1$-$C_{12}$ alkyl), N($C_1$-$C_{12}$ alkyl)($C_1$-$C_{12}$ alkyl), —COOH, —O—$C_1$-$C_{12}$ alkyl, —C(O)—$C_1$-$C_{12}$ alkyl, —O—C(O)—$C_1$-$C_{12}$ alkyl, —C(O)—O—$C_1$-$C_{12}$ alkyl, —$SO_3H$, —$SO_2NH_2$, —O—$S(O)_2$—OH, —O—$P(O)_2(OH)$, and —$P(O)(OH)_2$.

3.31 Any one of compounds 3.1-3.28, wherein the alkyl and/or aryl moieties of $R^2$ are each independently further substituted by one or more groups selected from halo (—F, —Cl, —Br, or —I), —CN, OH, $NH_2$, NH($C_1$-$C_{12}$ alkyl), N($C_1$-$C_{12}$ alkyl)($C_1$-$C_{12}$ alkyl), —COOH, —$SO_3H$, —$SO_2NH_2$, —O—$S(O)_2$—OH, —O—$P(O)_2(OH)$, and —$P(O)(OH)_2$.

3.32 Any one of compounds 3.1-3.28, wherein the alkyl and/or aryl moieties of $R^2$ are each independently further substituted by one or more groups selected from halo (—F, —Cl, —Br, or —I), —OH, $NH_2$, —COOH, —$SO_3H$, —$SO_2NH_2$, —O—$S(O)_2$—OH, —O—P$(O)_2(OH)$, and —$P(O)(OH)_2$.

3.33 Any one of compounds 3.1-3.28, wherein the alkyl and/or aryl moieties of $R^2$ are each independently further substituted by one or more groups selected from halo (—F, —Cl, —Br, or —I), —OH, $NH_2$, —COOH, and $SO_3H$.

3.34 Any one of compounds 3.1-3.28, wherein the alkyl and/or aryl moieties of $R^2$ are each independently further substituted by one or more OH.

3.35 Any one of compounds 3.1-3.23, wherein $R^2$ is selected from $C_1$-$C_6$ alkyl, —O—$C_1$-$C_6$alkyl, —C(O)—$C_1$-$C_6$ alkyl, —O—C(O)—$C_1$-$C_6$ alkyl, —C(O)—O—$C_1$-$C_6$ alkyl, —O—C(O)—O—$C_1$-$C_6$ alkyl, wherein each of said alkyl is optionally substituted by one or more OH.

3.36 Any one of compounds 3.1-3.23, wherein $R^2$ is selected from —O—$C_1$-$C_3$ alkyl, —C(O)—$C_1$-$C_3$ alkyl, —O—C(O)—$C_1$-$C_3$ alkyl, —C(O)—O—$C_1$-$C_3$ alkyl, —O—C(O)—O—$C_1$-$C_3$ alkyl, wherein each of said alkyl is optionally substituted by one or more OH.

3.37 Compound 3.36, wherein each of said $C_1$-$C_3$ alkyl is selected from —$CH_2CH_2OH$, —$CH(OH)CH_3$, —CH(OH)$CH_2$(OH), —$CH_2CH_2CH_2OH$, —$CH_2CH(OH)CH_3$, —$CH(OH)CH_2CH_3$, —$CH_2CH(OH)CH_2OH$, —$CH(OH)CH_2CH_2OH$, —$CH(OH)CH(OH)CH_3$, and —$CH(OH)CH(OH)CH_2OH$.

3.38 Compound 3.37, wherein each of said $C_1$-$C_3$ alkyl is selected from $CH_2CH_2OH$, $CH(OH)CH_2(OH)$, $CH_2CH(OH)CH_3$, $CH_2CH(OH)CH_2OH$, and $CH(OH)CH(OH)CH_2OH$.

3.39 Compound 3.37, wherein each of said $C_1$-$C_3$ alkyl is selected from —$OCH_2CH_2OH$, —$OCH_2CH(OH)CH_3$, —$OCH_2CH(OH)CH_2OH$, —(CO)—$CH_2CH_2OH$, —(CO)—$CH_2CH(OH)CH_3$, —C(O)—$CH_2CH(OH)CH_2OH$, —O(CO)—$CH_2CH_2OH$, —O(CO)—$CH_2CH(OH)CH_3$, —OC(O)—$CH_2CH(OH)CH_2OH$, —(CO)—O—$CH_2CH_2OH$, —(CO)—O—$CH_2CH(OH)CH_3$, and —C(O)—O—$CH_2CH(OH)CH_2OH$.

3.40 Any preceding compound, wherein:
X is a bond, and Y is H; or
X is a bond, Y is —C(O)—, $R^1$ is $CH_2$ or $CH_2CH_2$, and $R^2$ is —COOH; or
X is a bond, Y is —C(O)—, $R^1$ is $CH_2$ or $CH_2CH_2$, and $R^2$ is —$SO_3H$ or —O—$S(O)_2OH$; or
X is a bond, Y is —$S(O)_2$—, $R^1$ is a bond, and $R^2$ is OH; or
X is a bond, Y is —C(O)—, $R^1$ is a bond, and $R^2$ is $CH_2CH_2OH$; or
X is a bond, Y is —C(O)—, $R^1$ is a bond, and $R^2$ is $CH_2CH(OH)CH_2OH$; or
X is a bond, Y is —C(O)—, $R^1$ is a bond, and $R^2$ is $CH_3$.

3.41 Any preceding compound which comprises any group —COOH, —$SO_3H$, —O—$S(O)_2$—OH, —O—P$(O)_2(OH)$, or —$P(O)(OH)_2$, wherein said group is in the form of a salt, e.g., an alkali metal salt (e.g., lithium, sodium or potassium salt), or an alkaline earth metal salt (e.g., magnesium or calcium salt).

3.42 Any preceding compound which comprises any basic amine group (e.g., —$NH_2$), wherein said group is in the form of an acid addition salt, e.g., a salt with strong Bronsted acid (e.g., hydrochloride, sulfate, phosphate salt).

3.43 Any preceding compound wherein the terminal groups

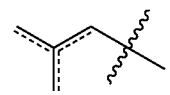

of the compound of Formula III-A or III-B are each:

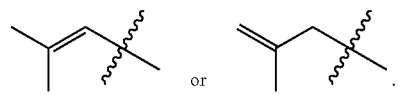

3.44 Any preceding compound wherein the terminal groups

of the compound of Formula III-A or III-B are each:

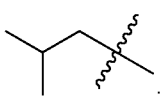 [SMILES: *CC(C)C]

In a fourth embodiment of the first aspect, the present disclosure provides a compound (Compound 4A) of the general formula (IV-A), or a compound (Compound 4B) of the general formula (IV-B):

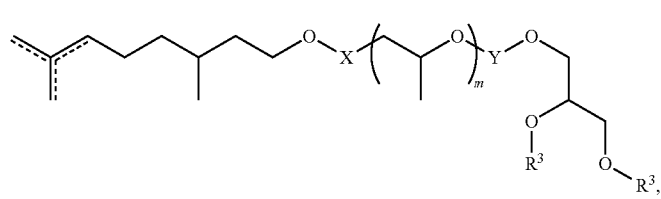

Formula (IV-A)

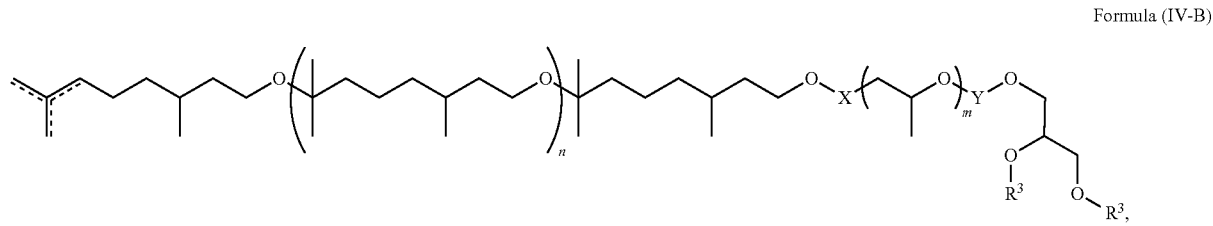

Formula (IV-B)

each in free or salt form, wherein:
n is an integer from 0-20 (e.g., 0-10);
m is an integer from 1-100 (e.g., 25-75);
X is selected from a bond, $CH_2$, $CH_2CH_2$, $CH_2C(O)$—, —$CH_2CH_2C(O)$—, $CH_2C(O)O$—, —$CH_2CH_2C(O)O$—, —$C(O)$—, —$C(O)$—$O$—, —$C(O)$—$N(R)$—, —$S(O)$—, —$S(O_2)$—, —$S(O_2)$—$O$—, and —$S(O_2)$—$N(R)$—; Y is selected from $CH_2CH_2$, —$C(O)$—, —$CH_2CH_2$—$C(O)$—, —$CH_2CH_2$—$C(O)$—$O$—, —$S(O)$—, or —$S(O_2)$—;
R is selected from H and $C_1$-$C_6$ alkyl (e.g., methyl) optionally substituted by one or more OH;
each $R^3$ is independently selected from H, $C_1$-$C_{20}$ alkyl, $C_2$-$C_{20}$ alkenyl, —$C(O)$—$C_1$-$C_{20}$ alkyl, —$C(O)$—$C_2$-$C_{20}$ alkenyl, —$(CH_2CH_2O)_m$—$CH_2CH_2OH$, —$(CH_2CH_2O)_m$—$CH_2CH_2O$—$C_1$-$C_{20}$ alkyl, —$(CH_2CH_2O)_m$—$CH_2CH_2O$—$C_2$-$C_{20}$ alkenyl, —$(CH_2CH_2O)_m$—$CH_2CH_2O$—$C(O)$—$C_1$-$C_{20}$ alkyl, —$(CH_2CH_2O)_m$—$CH_2CH_2O$—$C(O)$—$C_2$-$C_{20}$ alkenyl, —$(CH_2CH(CH_3)O)_m$—$CH_2CH(CH_3)OH$, —$(CH_2CH(CH_3)O)_m$—$CH_2CH(CH_3)O$—$C_1$-$C_{20}$ alkyl, —$(CH_2CH(CH_3)O)_m$—$CH_2CH(CH_3)O$—$C_2$-$C_{20}$ alkenyl, —$(CH_2CH(CH_3)O)_m$—$CH_2CH(CH_3)O$—$C(O)$—$C_1$-$C_{20}$ alkyl, and —$(CH_2CH(CH_3)O)_m$—$CH_2CH(CH_3)O$—$C(O)$—$C_2$-$C_{20}$ alkenyl, —$CH_2CH_2OH$, —$CH_2CH(CH_3)OH$, —$CH_2COOH$, —$CH_2CH_2COOH$, —$S(O)_2$—$OH$, and —$P(O)_2(OH)$, or
one or both $R^3$ is a structure having the formula:

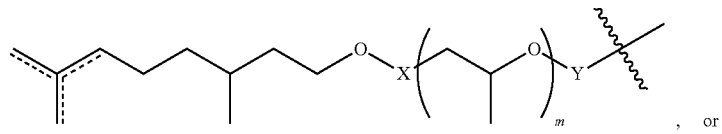

, or

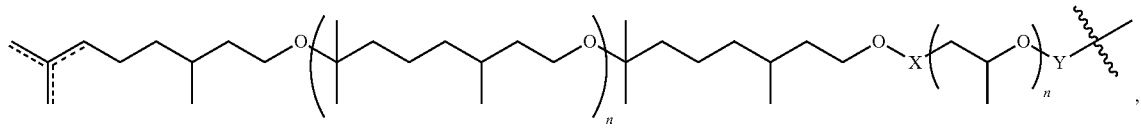

wherein X, Y, n and m are each independently as defined herein above.

In further embodiments of the first aspect, the present disclosure provides as follows:

4.1 The compound of Formula IV-A.
4.2 The compound of Formula IV-B.
4.3 Compound 4.2, wherein n is an integer from 0-10, e.g., 0-8, or 0-6, or 0-5, or any of 0, 1, 2, 3, or 4.
4.4 Compound 4.2, wherein n is 0, 1, 2 or 3.
4.5 Compound 4.2, wherein n is 0.
4.6 Compound 4.2, wherein n is 1.
4.7 Any one of compounds 4.1-4.6, wherein m is an integer from 1-75, e.g., 1-25, 25-50, 50-75, 25-75, 1-10, 11-20, 21-30, 31-40, 41-50, 51-60, 61-75, or any combination thereof.
4.8 Any one of compounds 4.1-4.7, wherein X is selected from $CH_2$, —C(O)—, —C(O)—O—, and —C(O)—N(R)—.
4.9 Any one of compounds 4.1-4.7, wherein X is selected from —S(O)—, —S($O_2$)—, —S($O_2$)—O—, and —S($O_2$)—N(R)—.
4.10 Any one of compounds 4.1-4.7, wherein X is selected from a bond, $CH_2$, —C(O)—, and —C(O)—O—.
4.11 Any one of compounds 4.1-4.7, wherein X is a bond.
4.12 Any one of compounds 4.1-4.11, wherein Y is selected from $CH_2CH_2$, —C(O)—, —$CH_2CH_2$—C(O)—, and —$CH_2CH_2$—C(O)—O—.
4.13 Any one of compounds 4.1-4.11, wherein Y is selected from —S(O)—, and —S($O_2$)—.
4.14 Any one of compounds 4.1-4.11, wherein Y is $CH_2CH_2$.
4.15 Any one of compounds 4.1-4.11, wherein Y is —C(O)—.
4.16 Any one of compounds 4.1-4.15, wherein R is H.
4.17 Any one of compounds 4.1-4.15, wherein R is $C_1$-$C_6$ alkyl (e.g., methyl, ethyl, propyl).
4.18 Any one of compounds 4.1-4.15, wherein R is $C_1$-$C_6$ alkyl substituted by one or more OH, e.g., R is selected from hydroxyethyl, hydroxypropyl, hydroxybutyl, hydroxypentyl, and hydroxhexyl.
4.19 Compound 4.18, wherein R is selected from —$CH_2CH_2OH$, —CH(OH)$CH_3$, —CH(OH)$CH_2$(OH), —$CH_2CH_2CH_2OH$, —$CH_2$CH(OH)$CH_3$, —CH(OH)$CH_2CH_3$, —$CH_2$CH(OH)$CH_2OH$, —CH(OH)$CH_2CH_2OH$, —CH(OH)CH(OH)$CH_3$, and —CH(OH)CH(OH)$CH_2OH$.
4.20 Any one of compounds 4.1-4.19, wherein $R^3$ is selected from H, $C_1$-$C_{20}$ alkyl, and $C_2$-$C_{20}$ alkenyl.
4.21 Compound 4.20, wherein $R^3$ is a $C_{6-18}$ alkyl, e.g., $C_{6-12}$ alkyl, $C_{12-18}$ alkyl, $C_{6-10}$ alkyl, $C_{10-14}$ alkyl, or $C_{14-18}$ alkyl.

4.22 Compound 4.20, wherein $R^3$ is a $C_{6-18}$ alkenyl, e.g., $C_{6-12}$ alkenyl, $C_{12-18}$ alkenyl, $C_{6-10}$ alkenyl, $C_{10-14}$ alkenyl, or $C_{14-18}$ alkenyl, each of which may optionally be monounsaturated or di-unsaturated.
4.23 Compound 4.20, wherein $R^3$ is a $C_{1-3}$ alkyl, e.g., $CH_2$ or $CH_2CH_2$.
4.24 Any one of compounds 4.1-4.19, wherein $R^3$ is —C(O)—$C_1$-$C_{20}$ alkyl or —C(O)—$C_2$-$C_{20}$ alkenyl.
4.25 Compound 4.24, wherein $R^3$ is a —C(O)—$C_{6-18}$ alkyl, e.g., —C(O)—$C_{6-12}$ alkyl, —C(O)—$C_{12-18}$ alkyl, —C(O)—$C_{6-10}$ alkyl, —C(O)—$C_{10-14}$ alkyl, or —C(O)—$C_{14-18}$ alkyl.
4.26 Compound 4.24, wherein $R^3$ is a —C(O)—$C_{6-18}$ alkenyl, e.g., —C(O)—$C_{6-12}$ alkenyl, —C(O)—$C_{12-18}$ alkenyl, —C(O)—$C_{6-10}$ alkenyl, —C(O)—$C_{10-14}$ alkenyl, or —C(O)—$C_{14-18}$ alkenyl, each of which may optionally be monounsaturated or di-unsaturated.
4.27 Any one of compounds 4.1-4.19, wherein $R^3$ is —($CH_2CH_2O$)$_m$—$CH_2CH_2OH$, wherein m is an integer from 1-75, e.g., 1-25, 25-50, 50-75, 25-75, 1-10, 11-20, 21-30, 31-40, 41-50, 51-60, 61-75, or any combination thereof.
4.28 Any one of compounds 4.1-4.19, wherein $R^3$ is selected from —($CH_2CH_2O$)$_m$ $CH_2CH_2O$—$C_1$-$C_{20}$ alkyl, —($CH_2CH_2O$)$_m$—$CH_2CH_2O$—$C_2$-$C_{20}$ alkenyl, —($CH_2CH_2O$)$_m$ $CH_2CH_2O$—C(O)—$C_1$-$C_{20}$ alkyl, and —($CH_2CH_2O$)$_m$—$CH_2CH_2O$—C(O)—$C_2$-$C_{20}$ alkenyl.
4.29 Compound 4.28, wherein m is an integer from 1-75, e.g., 1-25, 25-50, 50-75, 25-75, 1-10, 11-20, 21-30, 31-40, 41-50, 51-60, 61-75, or any combination thereof.
4.30 Compound 4.28 or 4.29, wherein said $C_1$-$C_{20}$ alkyl is a $C_{6-18}$ alkyl, e.g., $C_{6-12}$ alkyl, $C_{12-18}$ alkyl, $C_{6-10}$ alkyl, $C_{10-14}$ alkyl, or $C_{14-18}$ alkyl.
4.31 Compound 4.28 or 4.29, wherein said $C_2$-$C_{20}$ alkenyl is a $C_{6-18}$ alkenyl, e.g., $C_{6-12}$ alkenyl, $C_{12-18}$ alkenyl, $C_{6-10}$ alkenyl, $C_{10-14}$ alkenyl, or $C_{14-18}$ alkenyl.
4.32 Any one of compounds 4.1-4.19, wherein $R^3$ is:

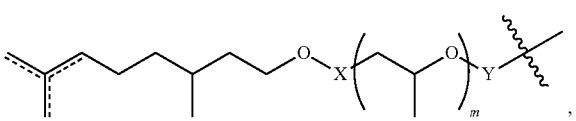

wherein X, Y and m are as defined in any of 4.1-4.19.

4.33 Any one of compounds 4.1-4.19, wherein $R^3$ is:

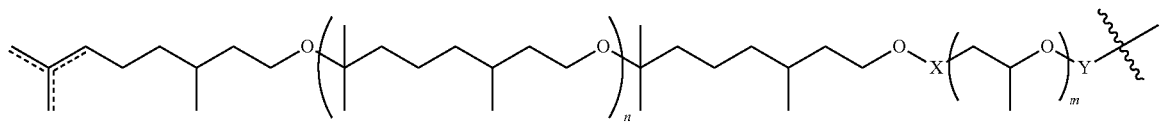

wherein X, Y, n and m are as defined in any of 4.1-4.19.

4.34 Any one of compounds 4.1-4.19, wherein $R^3$ is —CH$_2$CH$_2$OH, —CH$_2$CH(CH$_3$)OH, —CH$_2$COOH, —CH$_2$CH$_2$COOH, —S(O)$_2$—OH, or —P(O)$_2$(OH).

4.35 Any preceding compound, wherein:
X is a bond, and Y is CH$_2$CH$_2$; or
X is a bond, and Y is —C(O)—; or
X is a bond, and Y is —CH$_2$CH$_2$—C(O)—; or
X is a bond, and Y is —S(O)$_2$—.

4.36 Compound 4.35, wherein $R^3$ is H.

4.37 Compound 4.35, wherein $R^3$ is —CH$_2$CH$_2$OH, —CH$_2$CH(CH$_3$)OH, —CH$_2$COOH, —CH$_2$CH$_2$COOH, —S(O)$_2$—OH, or —P(O)$_2$(OH).

4.38 Compound 4.35, wherein the compound is the compound of Formula II-A and wherein $R^3$ is:

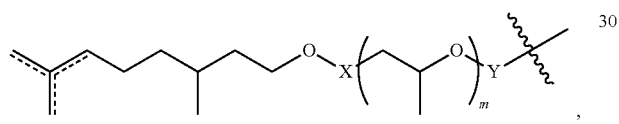

wherein X, Y and m are as defined for the compound of Formula II-A (i.e., all values of X, Y and m are the same in the compound).

4.39 Compound 4.34, wherein the compound is the compound of Formula II-B and wherein $R^3$ is:

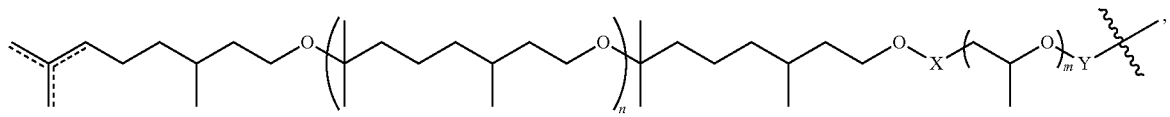

wherein X, Y, n, and m are as defined for the compound of Formula II-A (i.e., all values of X, Y, n, and m are the same in the compound).

4.40 Any preceding compound which comprises any group —COOH, —S(O)$_2$—OH, or —P(O)$_2$(OH), wherein said group is in the form of a salt, e.g., an alkali metal salt (e.g., lithium, sodium or potassium salt), or an alkaline earth metal salt (e.g., magnesium or calcium salt).

4.41 Any preceding compound which comprises any basic amine group (e.g., —NH$_2$), wherein said group is in the form of an acid addition salt, e.g., a salt with strong Bronsted acid (e.g., hydrochloride, sulfate, phosphate salt).

4.42 Any preceding compound wherein the terminal groups

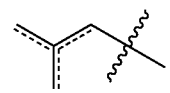

of the compound of Formula II-A or II-B are each:

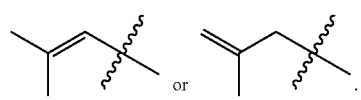

4.43 Any preceding compound wherein the terminal groups

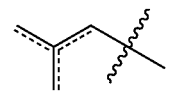

of the compound of Formula II-A or II-B are each:

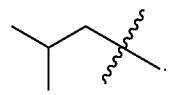 [SMILES: *CC(C)C]

The term "alkyl" as used herein refers to a monovalent or bivalent, branched or unbranched saturated hydrocarbon group having from 1 to 20 carbon atoms, typically although, not necessarily, containing 1 to about 12 carbon atoms, such as methyl, ethyl, n-propyl, isopropyl, n-butyl, isobutyl, t-butyl, octyl, and the like. The term alkyl also may include cycloalkyl groups. Thus, for example, the term C6 alkyl would embrace cyclohexyl groups, the term C5 would embrace cyclopentyl groups, the term C4 would embrace cyclobutyl groups, and the term C3 would embrace cyclopropyl groups. In addition, as the alkyl group may be branched or unbranched, any alkyl group of n carbon atoms would embrace a cycloalkyl group of less than n carbons substituted by additional alkyl substituents. Thus, for example, the term C6 alkyl would also embrace methylcyclopentyl groups, or dimethylcyclobutyl or ethylcyclobutyl groups, or trimethylcyclopropyl, ethylmethylcyclopropyl or propylcyclopropyl groups.

The term "alkenyl" as used herein refers to a monovalent or bivalent, branched or unbranched, unsaturated hydrocarbon group typically although not necessarily containing 2 to about 12 carbon atoms and 1-10 carbon-carbon double bonds, such as ethylene, n-propylene, isopropylene, n-butylene, isobutylene, t-butylene, octylene, and the like. In like manner as for the term "alkyl", the term "alkenyl" also embraces cycloalkenyl groups, both branched an unbranched with the double bond optionally intracyclic or exocyclic.

The term "aryl" as used herein refers to an aromatic hydrocarbon moiety comprising at least one aromatic ring of 5-6 carbon atoms, including, for example, an aromatic hydrocarbon having two fused rings and 10 carbon atoms (i.e., a naphthalene).

By "substituted" as in "substituted alkyl," "substituted alkenyl," "substituted alkynyl," and the like, it is meant that in the alkyl, alkenyl, alkynyl, or other moiety, at least one hydrogen atom bound to a carbon atom is replaced with one or more non-hydrogen substituents, e.g., by a functional group.

The terms "branched" and "linear" (or "unbranched") when used in reference to, for example, an alkyl moiety of $C_a$ to $C_b$ carbon atoms, applies to those carbon atoms defining the alkyl moiety. For example, for a $C_4$ alkyl moiety, a branched embodiment thereof would include an isobutyl, whereas an unbranched embodiment thereof would be an n-butyl. However, an isobutyl would also qualify as a linear $C_3$ alkyl moiety (a propyl) itself substituted by a $C_1$ alkyl (a methyl).

Unless otherwise specified, any carbon atom with an open valence may be further substituted by one or more additional functional groups. Examples of functional groups include, without limitation: halo, hydroxyl, sulfhydryl, $C_1$-$C_{20}$ alkoxy, $C_2$-$C_{20}$ alkenyloxy, $C_2$-$C_{20}$ alkynyloxy, $C_5$-$C_{20}$ aryloxy, acyl (including $C_2$-$C_{20}$ alkylcarbonyl (—CO-alkyl) and $C_6$-$C_{20}$ arylcarbonyl (—CO-aryl)), acyloxy (—O-acyl), $C_2$-$C_{20}$ alkoxycarbonyl (—(CO)—O-alkyl), $C_6$-$C_{20}$ aryloxycarbonyl (—(CO)—O-aryl), halocarbonyl (—CO)—X where X is halo), $C_2$-$C_{20}$ alkylcarbonato (—O—(CO)—O-alkyl), $C_6$-$C_{20}$ arylcarbonato (—O—(CO)—O-aryl), carboxy (—COOH), carboxylato (—COO—), carbamoyl (—(CO)—NH$_2$), mono-substituted $C_1$-$C_{20}$ alkylcarbamoyl (—(CO)—NH($C_1$-$C_{20}$ alkyl)), di-substituted alkylcarbamoyl (—(CO)—N($C_1$-$C_{20}$ alkyl)$_2$), mono-substituted arylcarbamoyl (—(CO)—NH-aryl), thiocarbamoyl (—(CS)—NH$_2$), carbamido (—NH—(CO)—NH$_2$), cyano (—C≡N), isocyano (—N$^+$≡C$^-$), cyanato (—O—C≡N), isocyanato (—O—N$^+$≡C$^-$), isothiocyanato (—S—C≡N), azido (—N=N$^+$=N$^-$), formyl (—(CO)—H), thioformyl (—(CS)—H), amino (—NH$_2$), mono- and di-($C_1$-$C_{20}$ alkyl)-substituted amino, mono- and di-($C_5$-$C_{20}$ aryl)-substituted amino, $C_2$-$C_{20}$ alkylamido (—NH—(CO)-alkyl), $C_5$-$C_{20}$ arylamido (—NH—(CO)-aryl), imino (—CR=NH where R=hydrogen, $C_1$-$C_{20}$ alkyl, $C_5$-$C_{20}$ aryl, $C_6$-$C_{20}$ alkaryl, $C_6$-$C_{20}$ aralkyl, etc.), alkylimino (—CR=N(alkyl), where R=hydrogen, alkyl, aryl, alkaryl, etc.), arylimino (—CR=N (aryl), where R=hydrogen, alkyl, aryl, alkaryl, etc.), nitro (—NO$_2$), nitroso (—NO), sulfo (—SO$_2$—OH), sulfonato (—SO$_2$—O$^-$), $C_1$-$C_{20}$ alkylsulfanyl (—S-alkyl; also termed "alkylthio"), arylsulfanyl (—S-aryl; also termed "arylthiol"), $C_1$-$C_{20}$ alkylsulfinyl (—(SO)-alkyl), $C_5$-$C_{20}$ arylsulfinyl (—(SO)-aryl), $C_1$-$C_{20}$ alkylsulfonyl (—SO$_2$-alkyl), $C_5$-$C_{20}$ arylsulfonyl (—SO$_2$-aryl), phosphono (—P(O)(OH)$_2$), phosphonato (—P(O)(O$^-$)$_2$), phosphinato (—P(O)(O$^-$)), phospho (—PO$_2$), -phosphino (—PH$_2$), mono- and di-($C_1$-$C_{20}$ alkyl)-substituted phosphino, mono- and di-($C_5$-$C_{20}$ aryl)-substituted phosphino; and the hydrocarbyl moieties such as $C_1$-$C_{20}$ alkyl (including $C_1$-$C_{18}$ alkyl, further including $C_1$-$C_{12}$alkyl, and further including $C_1$-$C_6$ alkyl), $C_2$-$C_{20}$ alkenyl (including $C_2$-$C_{18}$ alkenyl, further including $C_2$-$C_{12}$ alkenyl, and further including $C_2$-$C_6$ alkenyl), $C_2$-$C_{20}$ alkynyl (including $C_2$-$C_{18}$ alkynyl, further including $C_2$-$C_{12}$ alkynyl, and further including $C_2$-$C_6$ alkynyl), $C_5$-$C_{30}$ aryl (including $C_5$-$C_{20}$ aryl, and further including $C_5$-$C_{12}$ aryl), and $C_6$-$C_{20}$ aralkyl (including $C_6$-$C_{20}$ aralkyl, and further including $C_6$-$C_{12}$ aralkyl). In addition, the aforementioned functional groups may, if a particular group permits, be further substituted with one or more additional functional groups or with one or more hydrocarbyl moieties such as those specifically enumerated above. For example, the alkyl or alkenyl group may be branched. For example, the "substituent" is an alkyl group, e.g., a methyl group.

In a second aspect, the present disclosure provides a method of making any compound disclosed herein, e.g., the Compound 1 or Compound 2, et seq., comprising the step of reacting citronellol or a polycitronellol polymer with an alkoxylating agent to yield an alkoxylated derivative, optionally followed by reacting the alkoxylated derivative with one or more suitable reagents to provide the final compound. For example, a compound of Formula I-A may be formed as follows:

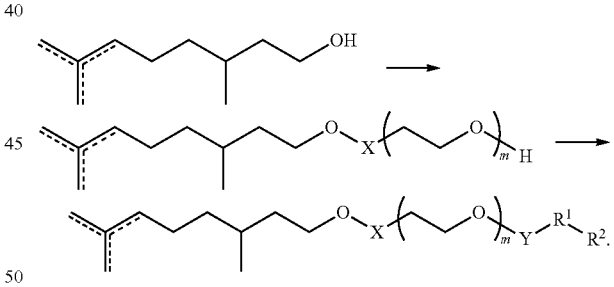

wherein substituents X, Y, $R^1$ and $R^2$, and m, are as defined hereinabove.

Suitable reagents, solvents and reactions conditions (concentration, time, temperature) for the conducting the reactions are generally known to those skilled in the art and are not limited in any way in the present disclosure. Depending on the choice of reagents, suitable solvents may include one or more of apolar, polar protic and/or polar aprotic solvents, for example hydrocarbons, ethers, and esters.

In another aspect, the present disclosure provides a composition comprising Compound 1A or 1B or any of 1.1 to 1.42, or Compound 2A or 2B or any of 2.1-2.43, or Compound 3A or 3B or any of 3.1 to 3.42, or Compound 4A or 4B or any of 4.1-4.43, optionally in admixture with one or more pharmaceutically acceptable, cosmetically acceptable, or industrially acceptable excipients or carriers, for example, solvents, oils, surfactants, emollients, diluents, glidants, abrasives, humectants, polymers, plasticizer, catalyst, antioxidant, coloring agent, flavoring agent, fragrance agent, antiperspirant agent, antibacterial agent, antifungal agent, hydrocarbon, stabilizer, or viscosity controlling agent. In some embodiments, the composition is a pharmaceutical composition, or a cosmetic composition, or a sunscreen composition, or a plastic composition, or a lubricant composition, or a personal care composition (e.g., a soap, skin cream or lotion, balm, shampoo, body wash, hydrating cream, deodorant, antiperspirant, after-shave lotion, cologne, perfume, or other hair care or skin care product), or a cleaning composition (e.g., a surface cleaner, a metal cleaner, a wood cleaner, a glass cleaner, a body cleaner such as a soap, a dish-washing detergent, or a laundry detergent), or an air freshener, or a crop-care formulation (e.g., herbicide, insecticide).

The compounds of the present disclosure, e.g., Compounds 1A, 1B, 2A, 2B, 3A, 3B, 4A, 4B, et seq., may be used with, e.g.: perfumes, soaps, insect repellants and insecticides, herbicides, detergents, household cleaning agents, air fresheners, room sprays, pomanders, candles, cosmetics, toilet waters, pre- and aftershave lotions, talcum powders, hair-care products, body deodorants, anti-perspirants, shampoo, cologne, shower gel, hair spray, and pet litter.

Fragrance and ingredients and mixtures of fragrance ingredients that may be used in combination with the disclosed compound for the manufacture of fragrance compositions include, but are not limited to, natural products including extracts, animal products and essential oils, absolutes, resinoids, resins, and concretes, and synthetic fragrance materials which include, but are not limited to, alcohols, aldehydes, ketones, ethers, acids, esters, acetals, phenols, ethers, lactones, furansketals, nitriles, acids, and hydrocarbons, including both saturated and unsaturated compounds and aliphatic carbocyclic and heterocyclic compounds, and animal products.

In some embodiments, the present disclosure provides personal care compositions including, but not limited to, soaps (liquid or solid), body washes, skin and hair cleansers, skin creams and lotions (e.g., facial creams and lotions, face oils, eye cream, other anti-wrinkle products), ointments, sunscreens, moisturizers, hair shampoos and/or conditioners, deodorants, antiperspirants, other conditioning products for the hair, skin, and nails (e.g., shampoos, conditioners, hair sprays, hair styling gel, hair mousse), decorative cosmetics (e.g., nail polish, eye liner, mascara, lipstick, foundation, concealer, blush, bronzer, eye shadow, lip liner, lip balm) and dermocosmetics.

In some embodiments, the personal care compositions may include organically-sourced ingredients, vegan ingredients, gluten-free ingredients, environmentally-friendly ingredients, natural ingredients (e.g. soy oil, beeswax, rosemary oil, vitamin E, coconut oil, herbal oils etc.), comedogenic ingredients, natural occlusive plant based ingredients (e.g. cocoa, shea, mango butter), non-comedogenic ingredients, bakuchiol (a plant derived compound used as a less-irritating, natural alternative to retinol), color active ingredients (e.g., pigments and dyes); therapeutically-active ingredients (e.g., vitamins, alpha hydroxy acids, corticosteroids, amino acids, collagen, retinoids, antimicrobial compounds), sunscreen ingredients and/or UV absorbing compounds, reflective compounds, oils (such as castor oil and olive oil, or high-viscosity oils), film formers, high molecular weight esters, antiperspirant active ingredients, glycol solutions, water, alcohols, emulsifiers, gellants, emollients, water, polymers, hydrocarbons, conditioning agents, and/or aliphatic esters.

In some embodiments, the present compositions are gluten free.

In some embodiments, the present compositions are formulated as oil-in-water emulsions, or as water-in-oil emulsions. In some embodiments, the compositions may further comprise one or more hydrocarbons, such as heptane, octane, nonane, decane, undecane, dodecane, isododecane, tridecane, tetradecane, pentadecane, hexadecane, heptadecane, octadecane, nonadecane, henicosane, docosane, and tricosane, and any saturated linear or saturated branched isomer thereof.

As used herein, the phrases "for example," "for instance," "such as," or "including" are meant to introduce examples that further clarify more general subject matter. These examples are provided only as an aid for understanding the disclosure, and are not meant to be limiting in any fashion. Furthermore, as used herein, the terms "may," "optional," "optionally," or "may optionally" mean that the subsequently described circumstance may or may not occur, so that the description includes instances where the circumstance occurs and instances where it does not. For example, the phrase "optionally present" means that an object may or may not be present, and, thus, the description includes instances wherein the object is present and instances wherein the object is not present.

As used herein, the phrase "having the formula" or "having the structure" is not intended to be limiting and is used in the same way that the term "comprising" is commonly used.

In the present specification, the structural formula of the compounds represents a certain isomer for convenience in some cases, but the present invention includes ail isomers, such as geometrical isomers, optical isomers based on an asymmetrical carbon, stereoisomers, tautomers, and the like. In addition, a crystal polymorphism may be present for the compounds represented by the formulas describe herein. It is noted that any crystal form, crystal form mixture, or anhydride or hydrate thereof is included in the scope of the present invention.

"Tautomers" refers to compounds whose structures differ markedly in arrangement of atoms, but which exist in easy and rapid equilibrium. It is to be understood that the compounds of the invention may be depicted as different tautomers. it should also be understood that when compounds have tautomeric forms, ail tautomeric forms are intended to be within the scope of the invention, and the naming of the compounds does not exclude any tautomeric form. Further, even though one tautomer may be described, the present invention includes all tautomers of the present compounds.

As used herein, the term "salt" can include acid addition salts including hydrochlorides, hydrobromides, phosphates, sulfates, hydrogen sulfates, alkylsulfonates, arylsulfonates, acetates, benzoates, citrates, maleates, fumarates, succinates, lactates, and tartrates; alkali metal cations such as Na+, K+, Li+, alkali earth metal salts such as Mg2+ or Ca2+, or organic amine salts, or organic phosphonium salts.

All percentages used herein, unless otherwise indicated, are by volume.

All ratios used herein, unless otherwise indicated, are by molarity.

EXAMPLES

The preparation of polycitronellol polymers, and some derivatives thereof, is described in, e.g., US 2017/0283553, US 2020/0165383, US 2021/0230364, WO 2021/133994, WO 2021/146461, WO 2021/146448, and WO 2021/178217, the contents of each of which are hereby incorporated by reference in their entireties.

The compounds disclosed herein can be prepared through a number of straightforward chemical reactions. In the following exemplary schemes, the moiety "A" may represent either citronellol or polycitronellol, each in either saturated or unsaturated form:

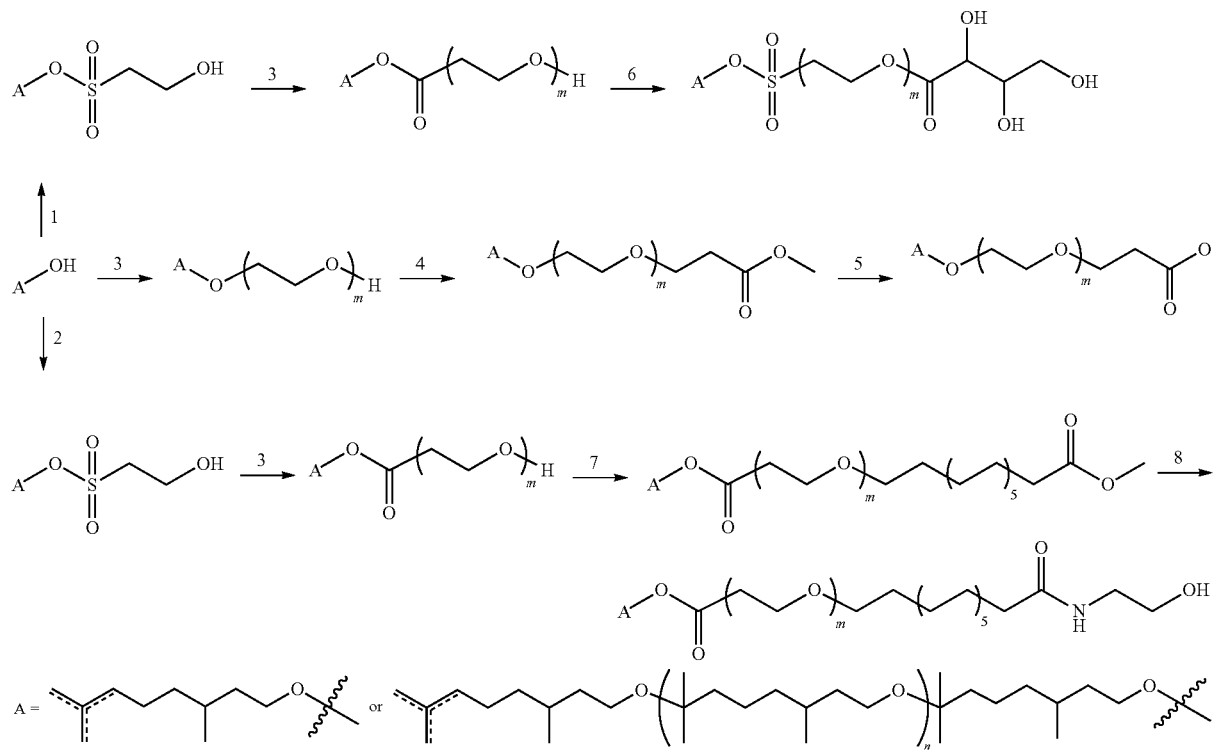

1- (i) ClSO₂CH₂OTBS, Et₃N, DCM; (ii) TBAF, THF
2- (i) ClC(O)CH₂CH₂OTBS, Et₃N, DCM; (ii) TBAF, THF

Other compounds within the scope of the present disclosure can be made by similar methods.

We claim:
1. A compound of the general formula (I-B):

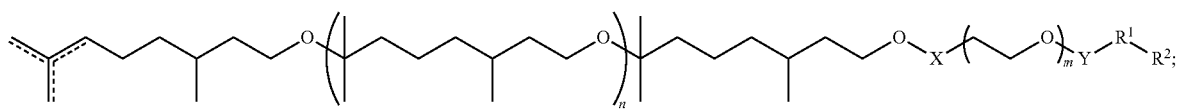

Formula (I-B)

or a compound of the general formula (II-B):

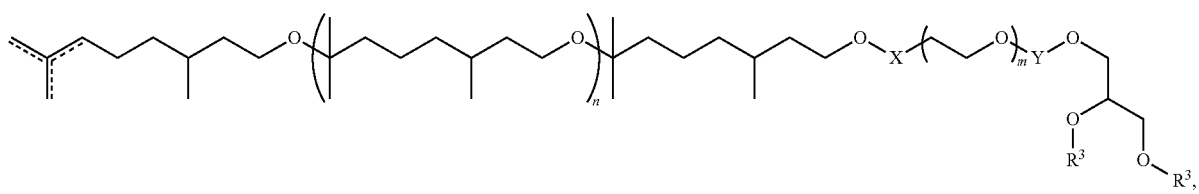

Formula (II-B)

or a compound of the general formula (III-B):

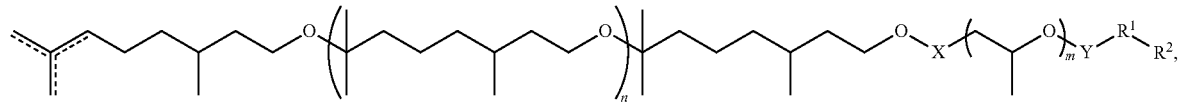

Formula (III-B)

or a compound of the general formula (IV-B):

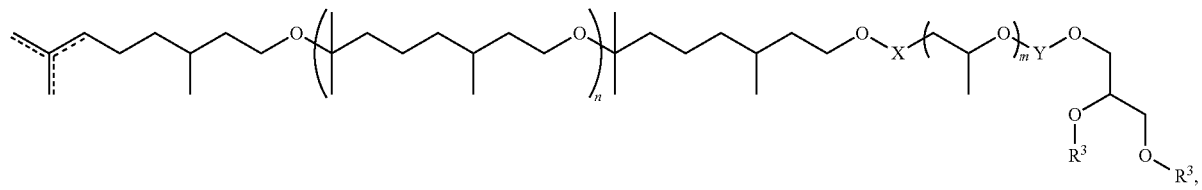

Formula (IV-B)

each in free or salt form, wherein:

n is an integer from 0-20;

m is an integer from 1-100;

X is selected from a bond, $CH_2$, $CH_2CH_2$, $CH_2C(O)$—, —$CH_2CH_2C(O)$—, $CH_2C(O)O$—, —$CH_2CH_2C(O)O$—, —$C(O)$—, —$C(O)$—O—, —$C(O)$—N(R)—, —S(O)—, —S(O_2)$—, —$S(O_2)$—O—, and —$S(O_2)$—N(R)—;

for the compounds of formulas I-B, and III-B, Y is selected from $CH_2$, $CH_2CH_2$, —$C(O)$—, —$C(O)$—O—, —$C(O)$—N(R)—, —S(O)—, —$S(O_2)$—, —$S(O_2)$—O—, and —$S(O_2)$—N(R)—;

for the compounds of formulas II-B, and IV-B, Y is selected from $CH_2CH_2$, —$C(O)$—, —$CH_2CH_2$—C(O)—, —$CH_2CH_2$—C(O)—O—, —S(O)—, or —$S(O_2)$—;

R is selected from H and $C_1$-$C_6$ alkyl optionally substituted by one or more OH;

$R^1$ is selected from a bond, $C_1$-$C_{20}$ alkyl, $C_2$-$C_{20}$ alkenyl, and $C_6$-$C_{20}$ aryl;

$R^2$ is selected from H, OH, $NH_2$, $NH(C_1$-$C_{12}$ alkyl), $N(C_1$-$C_{12}$ alkyl)($C_1$-$C_{12}$ alkyl), —COOH, $C_1$-$C_6$ alkyl, —O—$C_1$-$C_{12}$ alkyl, —O—$C_6$-$C_{20}$ aryl, —C(O)—$C_1$-$C_{12}$ alkyl, —C(O)—$C_6$-$C_{20}$ aryl, —O—C(O)—$C_1$-$C_{12}$ alkyl, —O—C(O)—$C_6$-$C_{20}$ aryl, —C(O)—O—$C_1$-$C_{12}$ alkyl, —C(O)—O—$C_6$-$C_{20}$ aryl, —O—C(O)—O—$C_1$-$C_{12}$ alkyl, —O—C(O)—O—$C_6$-$C_{20}$ aryl, —C(O)—$NH_2$, —C(O)—NH($C_1$-$C_{12}$ alkyl), —C(O)—N($C_1$-$C_{12}$ alkyl)$_2$, —C(O)—NH-aryl, —O—C(O)—NH($C_1$-$C_{12}$ alkyl), —O—C(O)—N($C_1$-$C_{12}$ alkyl)$_2$, —O—C(O)—NH—aryl, —$SO_3H$, —$SO_2NH_2$, —S(O)—$C_1$-$C_{12}$ alkyl, —S(O)—$C_6$-$C_{20}$ aryl, —$S(O)_2$—$C_1$-$C_{12}$ alkyl, —$S(O)_2$—$C_6$-$C_{20}$ aryl, —O—$S(O)_2$—$C_1$-$C_{12}$ alkyl, —O—$S(O)_2$—$C_6$-$C_{20}$ aryl, —$S(O)_2$—O—$C_1$-$C_{12}$ alkyl, —$S(O)_2$—O—$C_6$-$C_{20}$ aryl, —$S(O)_2$—NH($C_1$-$C_{12}$ alkyl), —$S(O)_2$—N($C_1$-$C_{12}$ alkyl)$_2$, —O—S(O)$_2$—OH, —O—P(O)$_2$(OH), and —P(O)(OH)$_2$;

wherein each of said $C_1$-$C_{12}$ alkyl and $C_6$-$C_{20}$ aryl moieties, are independently optionally further substituted by one or more groups selected from halo, —CN, OH, $NH_2$, $NH(C_1$-$C_{12}$ alkyl), $N(C_1$-$C_{12}$ alkyl)($C_1$-$C_{12}$ alkyl), —COOH, —O—$C_1$-$C_{12}$ alkyl, —C(O)—$C_1$-$C_{12}$ alkyl, —O—C(O)—$C_1$-$C_{12}$ alkyl, —C(O)—O—$C_1$-$C_{12}$ alkyl, $SO_3H$, —$SO_2NH_2$, —O—$S(O)_2$—OH, —O—P(O)$_2$(OH), and —P(O)(OH)$_2$; and each $R^3$ is independently selected from H, $C_1$-$C_{20}$ alkyl, $C_2$-$C_{20}$ alkenyl, —C(O)—C-$C_{20}$ alkyl, —C(O)—$C_2$-$C_{20}$ alkenyl, —$(CH_2CH_2O)_m$—$CH_2CH_2OH$, —$(CH_2CH_2O)_m$—$CH_2CH_2O$—$C_1$-$C_{20}$ alkyl, —$(CH_2CH_2O)_m$—$CH_2CH_2O$—$C_2$-$C_{20}$ alkenyl, —$(CH_2CH_2O)_m$—$CH_2CH_2O$—C(O)—$C_1$-$C_{20}$ alkyl, —$(CH_2CH_2O)_m$—$CH_2CH_2O$—C(O)—$C_2$-$C_{20}$ alkenyl, —$(CH_2CH(CH_3)O)_m$—$CH_2CH(CH_3)$OH, —$(CH_2CH(CH_3)O)_m$—$CH_2CH(CH_3)O$—$C_1$-$C_{20}$ alkyl, —$(CH_2CH(CH_3)O)_m$—$CH_2CH(CH_3)O$—$C_2$-$C_{20}$ alkenyl, —$(CH_2CH(CH_3)O)_m$—$CH_2CH(CH_3)O$—C(O)—$C_1$-$C_{20}$ alkyl, —$(CH_2CH(CH_3)O)_m$—$CH_2CH(CH_3)O$—C(O)—$C_2$-$C_{20}$ alkenyl, —$CH_2CH_2OH$, —$CH_2CH(CH_3)OH$, —$CH_2COOH$, —$CH_2CH_2COOH$, —$S(O)_2$—OH, and —$P(O)_2$(OH), or for the compound of Formula II-B, one or both $R^3$ is a structure having the formula:

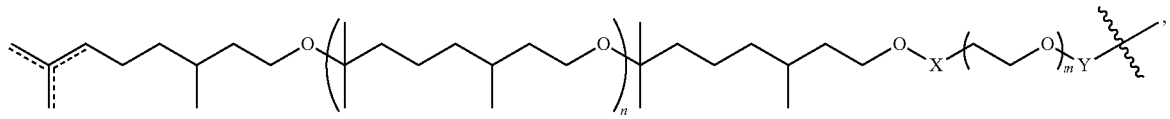

or for the compound of Formula-IV-B, one or both $R^3$ is a structure having the formula:

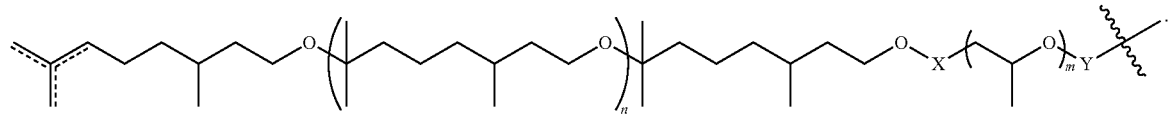

2. The compound of claim 1, wherein the compound is the compound of I-B.

3. The compound of claim 1, wherein the compound is the compound of III-B.

4. The compound of claim 1, wherein n is an integer from 0-10.

5. The compound of claim 1, wherein m is an integer from 1-75.

6. The compound of claim 1, wherein X is selected from a bond, $CH_2$, —C(O)—, —C(O)—O—, and —C(O)—N(R)—.

7. The compound of claim 1, wherein X is a bond.

8. The compound of claim 1, wherein Y is selected from $CH_2$, $CH_2CH_2$, and —C(O)—, or Y is selected from $CH_2CH_2$, —C(O)—, —$CH_2CH_2$—C(O)—, and —$CH_2CH_2$—C(O)—O—.

9. The compound of claim 2, wherein $R^1$ is selected from a bond, $C_1$-$C_{20}$ alkyl, and $C_2$-$C_{20}$ alkenyl.

10. The compound of claim 2, wherein $R^2$ is selected from H, OH, $NH_2$, NH($C_1$-$C_{12}$ alkyl), N($C_1$-$C_{12}$ alkyl)($C_1$-$C_{12}$ alkyl), and —COOH.

11. The compound of claim 2, wherein $R^2$ is selected from $C_1$-$C_6$ alkyl, —O—$C_1$-$C_{12}$ alkyl, —O—$C_6$-$C_{20}$ aryl, —C(O)—$C_1$-$C_{12}$ alkyl, —C(O)—$C_6$-$C_{20}$ aryl, —O—C(O)—$C_1$-$C_{12}$ alkyl, —O—C(O)—$C_6$-$C_{20}$ aryl, —C(O)—O—$C_1$-$C_{12}$ alkyl, —C(O)—O—$C_6$-$C_{20}$ aryl, —O—C(O)—O—$C_1$-$C_{12}$ alkyl, —O—C(O)—O—$C_6$-$C_{20}$ aryl, —C(O)—$NH_2$, —C(O)—NH($C_1$-$C_{12}$ alkyl), —C(O)—N($C_1$-$C_{12}$ alkyl)$_2$, —C(O)—NH-aryl, —O—C(O)—NH($C_1$-$C_{12}$ alkyl), —O—C(O)—N($C_1$-$C_{12}$ alkyl)$_2$), and —O—C(O)—NH-aryl.

12. The compound of claim 2, wherein $R^2$ is selected from H, OH, $NH_2$, $NHCH_3$, $N(CH_3)_2$, $OCH_3$, —C(O) $CH_3$, —O—C(O)—$CH_3$, —COOH, —$SO_3H$, —O—$S(O)_2$—OH, —O—$P(O)_2(OH)$, and —$P(O)(OH)_2$.

13. The compound of claim 2, wherein $R^2$ is selected from —O—$C_1$-$C_3$ alkyl, —C(O)—$C_1$-$C_3$ alkyl, —O—C(O)—$C_1$-$C_3$ alkyl, —C(O)—O—$C_1$-$C_3$ alkyl, and —O—C(O)—O—$C_1$-$C_3$ alkyl, and each of said $C_1$-$C_3$ alkyl is selected from $CH_2CH_2OH$, $CH(OH)CH_2(OH)$, $CH_2CH(OH)CH_3$, $CH_2CH(OH)CH_2OH$, and $CH(OH)CH(OH)CH_2OH$.

14. The compound of claim 1, wherein the compound is the compound of II-B.

15. The compound of claim 1, wherein the compound is the compound of IV-B.

16. The compound of claim 14, wherein $R^3$ is selected from H, $C_1$-$C_{20}$ alkyl, and $C_2$-$C_{20}$ alkenyl.

17. The compound of claim 14, wherein $R^3$ is -C(O)—$C_1$-$C_{20}$ alkyl or —C(O)—$C_2$-$C_{20}$ alkenyl.

18. The compound of claim 14, wherein $R^3$ is -$CH_2CH_2OH$, —$CH_2CH(CH_3)OH$, —$CH_2COOH$, —$CH_2CH_2COOH$, —$S(O)_2$—OH, or —$P(O)_2(OH)$.

19. The compound of claim 14, wherein $R^3$ is:

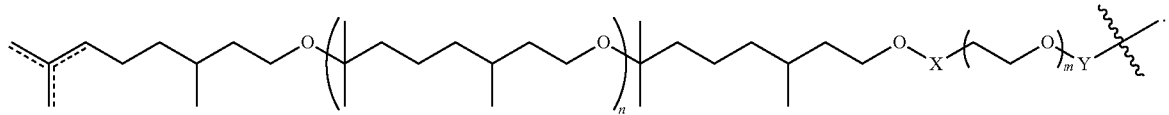

20. The compound of claim 15, wherein $R^3$ is:

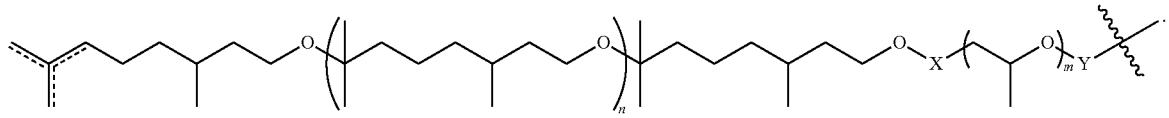

21. A composition comprising a compound according to claim 1, optionally in admixture with one or more pharmaceutically acceptable, cosmetically acceptable, or industrially acceptable excipients or carriers, selected from the group consisting of solvents, oils, surfactants, emollients, diluents, glidants, abrasives, humectants, polymers, plasticizers, catalysts, antioxidants, coloring agents, flavoring agents, fragrance agents, antiperspirant agents, antibacterial agents, antifungal agents, hydrocarbons, stabilizers, and viscosity controlling agent.

22. The composition of claim 21, wherein the composition is a pharmaceutical composition, or a cosmetic composition, or a sunscreen composition, or a plastic composition, or a lubricant composition, or a personal care composition, or a cleaning composition, or an air freshener, or a crop-care formulation.

23. The composition of claim 22, wherein the composition is a soap, skin cream, skin lotion, balm, shampoo, body wash, hydrating cream, deodorant, antiperspirant, aftershave lotion, cologne, perfume, or skin care product, or wherein the composition is a surface cleaner, metal cleaner, wood cleaner, glass cleaner, body cleaner, dish-washing detergent, or a laundry detergent, or wherein the composition is an herbicide or insecticide.

24. The compound of claim 2, wherein $R^2$ is selected from —OCH$_2$CH$_2$OH, —OCH$_2$CH(OH)CH$_3$, —OCH$_2$CH(OH)CH$_2$OH, —(CO)—CH$_2$CH$_2$OH, —(CO)—CH$_2$CH(OH)CH$_3$, —C(O)—CH$_2$CH(OH)CH$_2$OH, —O(CO)—CH$_2$CH$_2$OH, —O(CO)—CH$_2$CH(OH)CH$_3$, —OC(O)—CH$_2$CH(OH)CH$_2$OH, —(CO)—O—CH$_2$CH$_2$OH, —(CO)—O—CH$_2$CH(OH)CH$_3$, and —C(O)—O—CH$_2$CH(OH)CH$_2$OH.

\* \* \* \* \*